(12) United States Patent
Tsuchinaga et al.

(10) Patent No.: US 7,787,500 B2
(45) Date of Patent: Aug. 31, 2010

(54) PACKET RECEIVING METHOD AND DEVICE

(75) Inventors: Yoshiteru Tsuchinaga, Yokohama (JP); Yasuji Ota, Kawasaki (JP); Masanao Suzuki, Kawasaki (JP); Takashi Makiuchi, Yokohama (JP); Keiichi Kojima, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 1186 days.

(21) Appl. No.: 10/927,987

(22) Filed: Aug. 27, 2004

(65) Prior Publication Data

US 2005/0238013 A1    Oct. 27, 2005

(30) Foreign Application Priority Data

Apr. 27, 2004    (JP)    ............... 2004-131586

(51) Int. Cl.
  *H04B 7/185*    (2006.01)
  *H04L 7/02*    (2006.01)
(52) U.S. Cl. .................. 370/516; 375/359; 375/371
(58) Field of Classification Search ............... 370/503, 370/507, 508, 516, 517, 519; 375/354, 359, 375/362, 371, 372
  See application file for complete search history.

(56) References Cited

U.S. PATENT DOCUMENTS

| 5,623,483 | A * | 4/1997 | Agrawal et al. | ............. 370/519 |
| 6,683,889 | B1 * | 1/2004 | Shaffer et al. | ............. 370/516 |
| 6,757,292 | B2 * | 6/2004 | Pate et al. | ............. 370/412 |
| 7,110,422 | B1 * | 9/2006 | Choudhury et al. | ......... 370/516 |
| 2002/0034273 | A1 * | 3/2002 | Spence et al. | ............. 375/354 |
| 2003/0043856 | A1 * | 3/2003 | Lakaniemi et al. | .......... 370/503 |
| 2003/0086372 | A1 * | 5/2003 | Pate et al. | .................... 370/235 |
| 2003/0169777 | A1 | 9/2003 | Fuse | |
| 2004/0120309 | A1 * | 6/2004 | Kurittu et al. | ................ 370/352 |
| 2004/0141576 | A1 * | 7/2004 | Sonoda | ........................ 375/372 |
| 2005/0089127 | A1 * | 4/2005 | Nagaraja | ..................... 375/354 |

FOREIGN PATENT DOCUMENTS

| JP | 11-177623 | 7/1999 |
| JP | 2004-160826 | 6/2001 |
| JP | 2003-46490 | 2/2003 |
| JP | 2003-046490 | 2/2003 |
| JP | 2003-258894 | 9/2003 |
| JP | 2004-048343 | 2/2004 |

OTHER PUBLICATIONS

Notification of Reason(s) for Refusal dated Mar. 3, 2009, from the corresponding Japanese Application.
Decision of Refusal dated Sep. 29, 2009, from the corresponding Japanese Application.

* cited by examiner

*Primary Examiner*—Steven H Nguyen
*Assistant Examiner*—Kerri M Rose
(74) *Attorney, Agent, or Firm*—Katten Muchin Rosenman LLP

(57) ABSTRACT

In a packet receiving method and device which convert a voice packet received into a voice, a receiving packet buffer temporarily stores a voice packet received; a plurality of parameter information monitors respectively determine different buffer adjustment values for determining a buffering amount of the receiving packet buffer based on one or more pieces of parameter information obtained from the voice packet temporarily stored; a buffer adjustment value determiner determines a receiving buffer adjustment value from the plural buffer adjustment values; and a buffer controller controls the buffering amount based on the receiving buffer adjustment value.

17 Claims, 21 Drawing Sheets

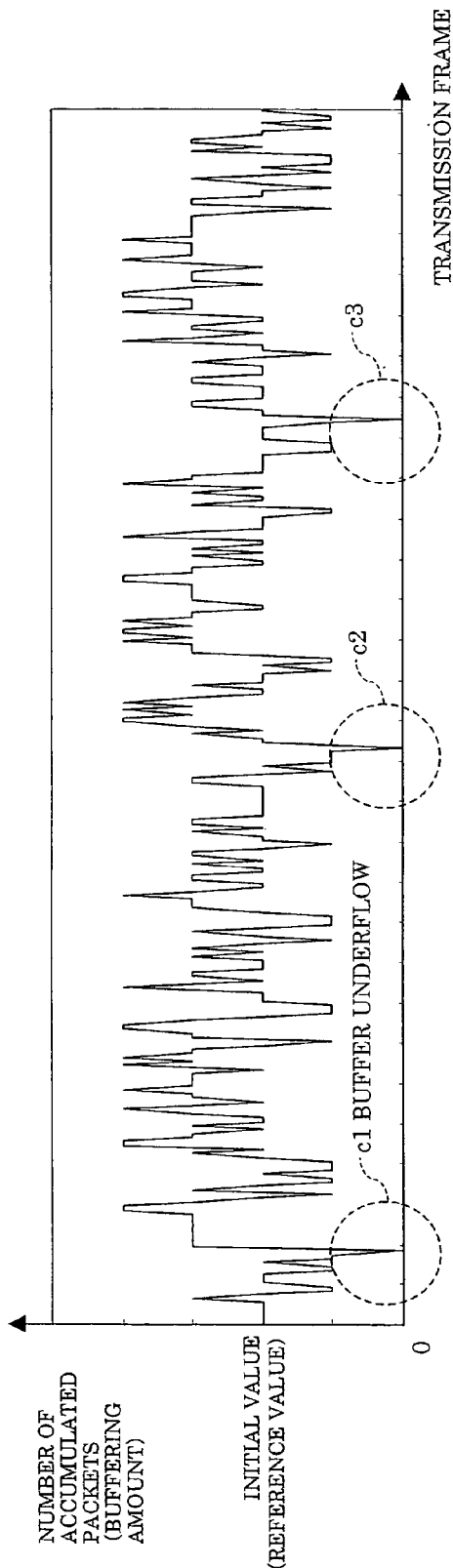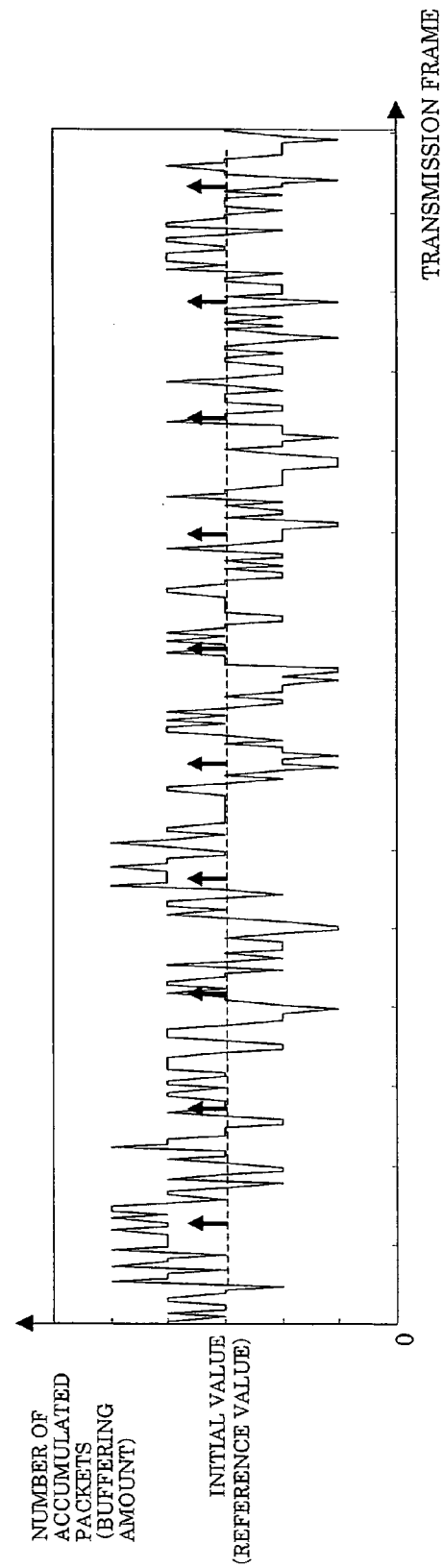

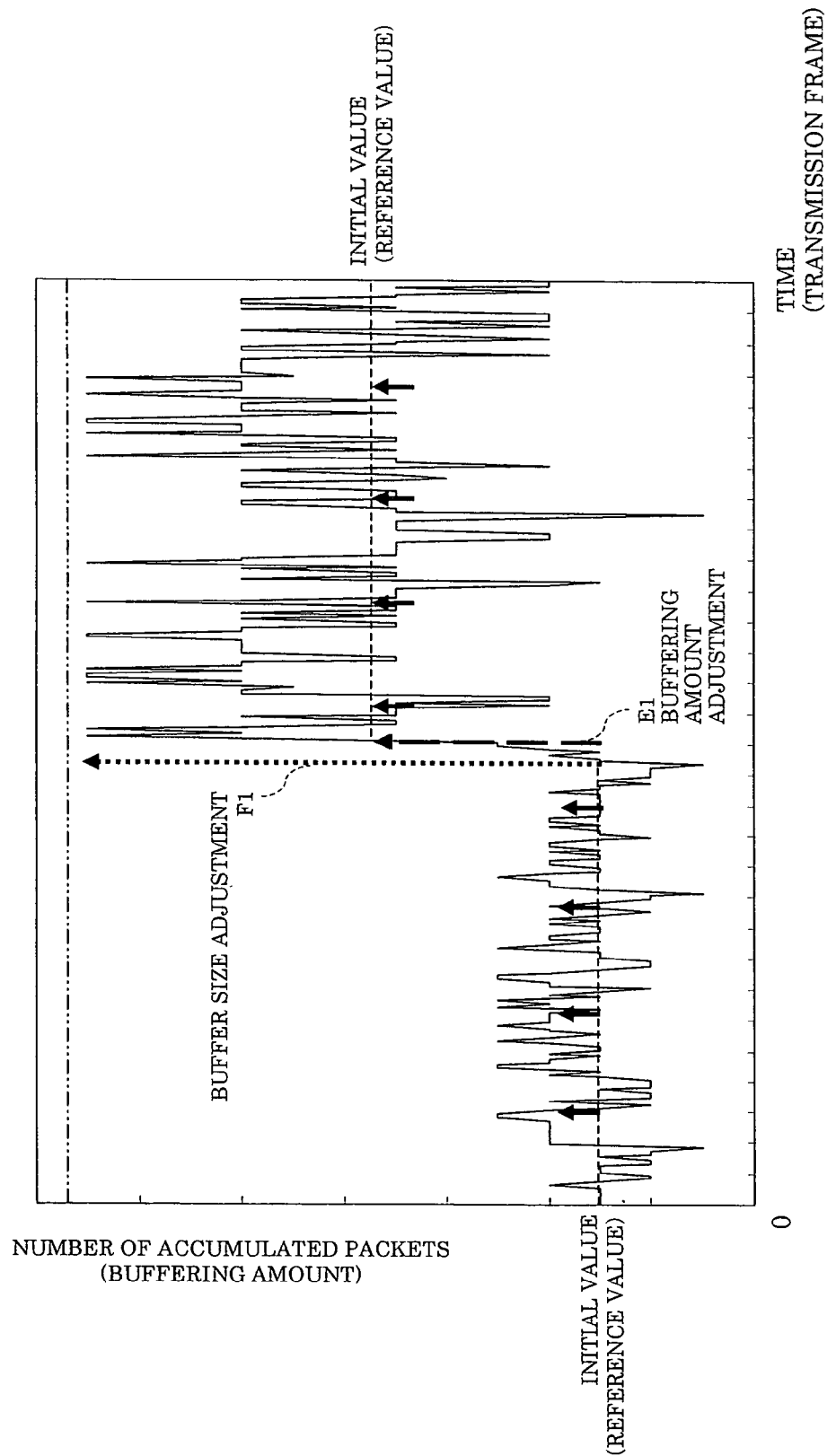

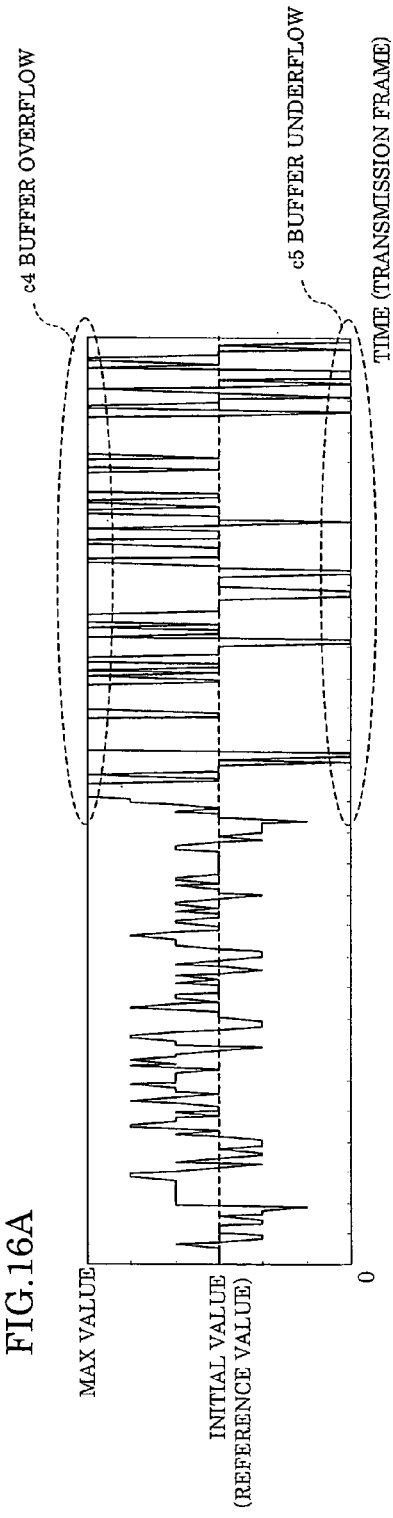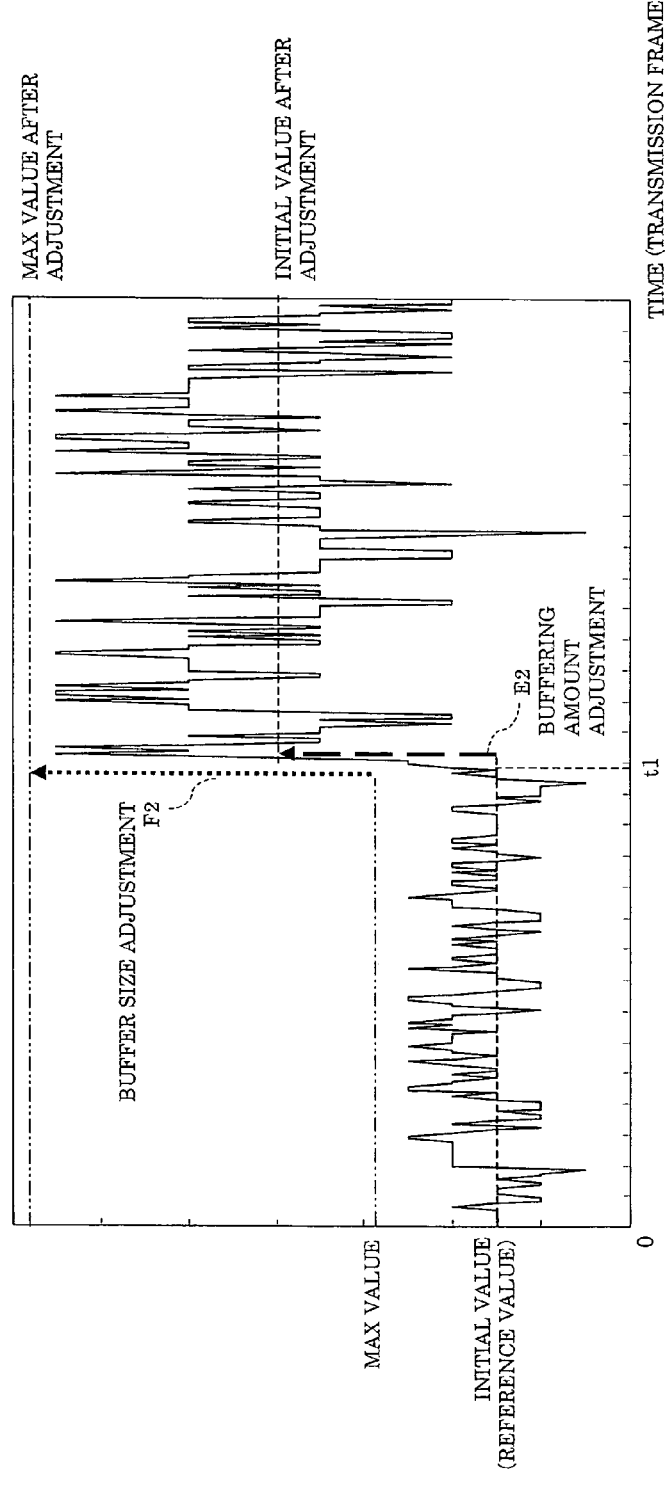
FIG.16A
FIG.16B

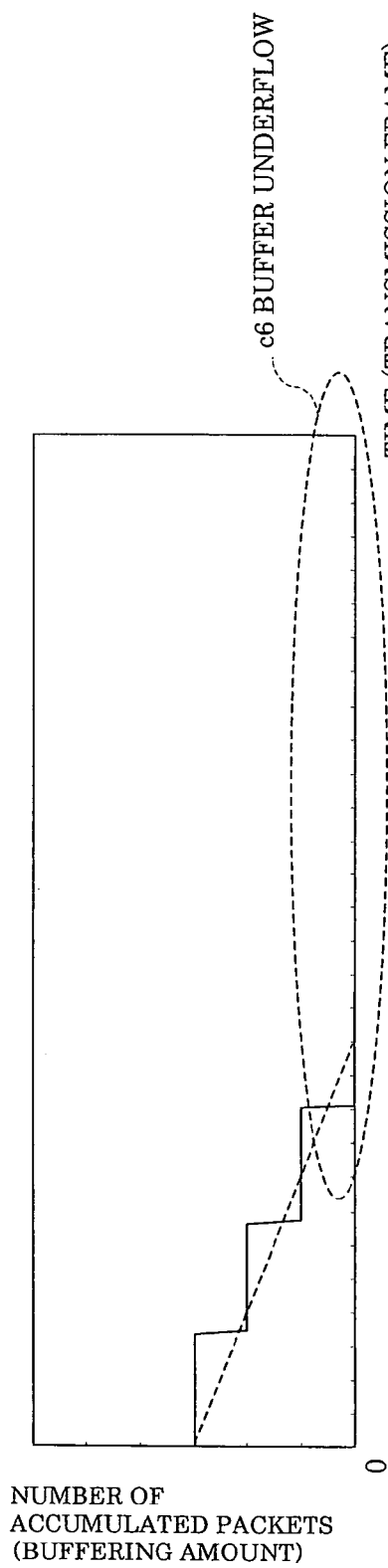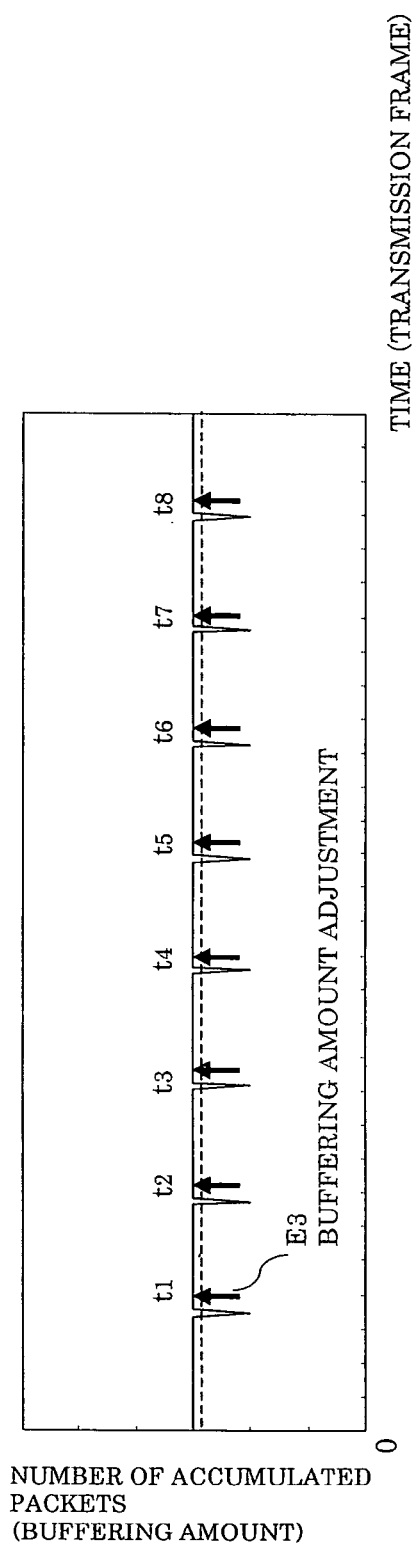
FIG.18A
FIG.18B

PACKET RECEIVING METHOD AND DEVICE

BACKGROUND OF THE INVENTION

1. Field of the Invention

The present invention relates to a packet receiving method and device, and in particular to a packet receiving method and device which convert a voice packet received into a voice.

Together with a recent rapid spread of the Internet, a VoIP communication for transmitting IP-packetized voice data over an IP network has been receiving attention for its inexpensive communication cost. The IP network is of a best-effort type, and the bandwidth of a transmission line between a transmitting device and a receiving device is not guaranteed. The resultant communication sound quality deteriorates due to a transmission delay fluctuation (hereinafter, occasionally referred to as jitter) or the like caused by congestions or the like. Also, due to operations of the transmitting device and the receiving device with mutually independent clocks, a clock shift therebetween makes the communication sound quality deteriorate. Technologies for preventing such a deterioration of the communication sound quality are becoming more and more important.

2. Description of the Related Art

FIG. 15 shows an absorbing principle of a transmission delay fluctuation of a voice packet 50 in a general voice packet receiving device 100. The packet receiving device 100 is provided with a receiving packet buffer 10 and a voice reproducer 40. The packet receiving device 100 receives the voice packet 50 arriving irregularly due to a jitter (at step S10) to be temporarily accumulated (at step S11). The receiving packet buffer 10 regularly transfers the voice packet 50 temporarily accumulated to the voice reproducer 40 (at step S12). Thus, the transmission (transfer) delay fluctuation of the voice packet 50 on its receiving side is absorbed, so that a stable sound quality without a sound interruption and a sound skip can be maintained.

FIGS. 16A and 16B show a variation of the "number of packets temporarily accumulated (hereinafter, occasionally referred to as the number of accumulated packets or buffering amount)" by the receiving packet buffer 10 resulting from the jitter. FIG. 16A specifically shows the variation of the buffering amount in the absence of clock shifts. The receiving packet buffer 10 is controlled to temporarily accumulate the voice packet 50 so that the number of accumulated packets may become e.g. the half (hereinafter, occasionally referred to as initial value (reference value)) of the maximum accumulable capacity (buffer size). The receiving packet buffer 10 thus controlled can absorb the jitter in the positive direction or negative direction equal to or less than the initial value, in the former half (left half) of FIG. 16A. In the latter half (right half), it can not absorb all of the jitters in the positive direction or negative direction equal to or more than the initial value. Therefore, a buffer overflow c4 or a buffer underflow c5 respectively occurs, so that the voice packet received 50 is discarded or an interrupted transmission state of the voice packet 50 occurs.

In order to eliminate the discard or interrupted state, the maximum capacity and the initial value of the receiving packet buffer 10 may be set simply large. However, the transmission delay of the received packet is increased by the number of accumulated packets temporarily accumulated in the receiving packet buffer 10. This increase in the transmission delay interferes with conversations in a interactive communication. For example, unnatural conversations resulting from a large transmission delay in a satellite relay or the like can be mentioned.

Thus, if the number of accumulated packets (buffering amount) of the receiving packet buffer 10 is too small, all of the jitter can not be absorbed and a sound quality deterioration such as a sound interruption is caused, while when it is too large, the transmission delay is caused, that is a trade-off relationship. Accordingly, it is necessary that the number of accumulated packets of the receiving packet buffer 10 is optimized to a requisite minimum value which can secure the sound quality according to the jitter resulting from a network used, and that the delay resulting from the temporary accumulation in the receiving packet buffer 10 is made as small as possible.

FIG. 16B shows a case where the number of accumulated packets (buffering amount) of the receiving packet buffer 10 is adjusted (controlled). Namely, in the receiving packet buffer 10, the buffering amount is controlled corresponding to the jitter amount, which is different from the receiving packet buffer 10 of FIG. 16A. FIG. 16B is the same as FIG. 16A up to a point t1 of 16B. However, after the point t1 when the jitter becomes abruptly large, the maximum value (buffer size) and the initial value (reference value) of the receiving packet buffer 10 are adjusted or controlled to the capacities which can accumulate the maximum value of the jitter in the positive/negative direction (see F2 and E2). Thus, the buffer overflow c4 and the buffer underflow c5 shown in FIG. 16A do not occur in the receiving packet buffer 10, so that the sound skip and the sound interruption resulting from the jitter can be prevented.

FIG. 16B shows a case where the maximum value of the jitter abruptly varies at the point t1. However, the maximum value of the jitter differs even on the same network according to time zones at which usages concentrate or usages are fewer such as at midnight. Furthermore, the maximum value momentarily varies even within the same time zone. Accordingly, in order to maintain the number of accumulated packets (buffering amount) at on optimum value, a real-time adjustment according to a network state is required.

In the VoIP communication, there is a problem of a "clock shift" between the transmitting and receiving devices in addition to the above-mentioned jitter. Namely, when there is a shift (deviation) between a clock of a recorder on a transmitting device side and a clock of the voice reproducer 40 on a receiving device side, an excess or a deficiency of the steady number of accumulated packets occurs in the receiving packet buffer 10.

FIG. 17 shows an ideal state of the receiving packet buffer 10, as well as the number of accumulated packets (buffering amount) of the receiving packet buffer 10 when no clock shift or jitter occurs. The number of accumulated packets always maintains the initial value.

FIGS. 18A and 18B show an example of the variation of the number of accumulated packets (buffering amount) due to the clock shift. FIG. 18A specifically shows the number of accumulated packets of the receiving packet buffer 10 when a reproduced clock of the voice reproducer 40 is faster than the clock of the recorder of a voice packet transmitting device. As for the number of accumulated packets, since the voice packet 50 is not received in time for the reproduction rate, a state of a buffer underflow c6 occurs in which the voice packet 50 has not arrived at the packet transmission time. Conversely, when the reproduced clock is late, the reproduction rate is not in time for the packet reception and an overflow (not shown) occurs in the receiving packet buffer 10.

As a result, a loss or discard of the voice packet 50 occurs, the sound interruption and the sound skip occur, and the sound quality is significantly reduced. Accordingly, in order to prevent the occurrence of such a steady underflow or overflow in the receiving buffer, the number of accumulated packets of the receiving packet buffer 10 is required to be adjusted according to the clock shift.

FIG. 18B shows an example of the buffering amount (the number of accumulated packets) adjustment (control) of the receiving packet buffer 10 accommodating to the buffer underflow resulting from the clock shift. At the points t1, t2, . . . , the buffering amount is adjusted as shown by E3 and the occurrence of the buffer underflow c6 shown in FIG. 18A is avoided.

Various technologies for resolving the above-mentioned jitter and clock shift have been proposed. One example for (1) a technology accommodating to the jitter and (2) a technology accommodating to the clock shift will now be described.

(1) Technology Accommodating to Jitter (Transmission Delay Fluctuation)

FIG. 19 shows a prior art example (1) of a packet receiving device. A packet receiving device 100a accommodates to a jitter, and is provided with a receiving packet buffer 20, a buffer controller 21, and a jitter measurer 22. The receiving packet buffer 20 temporarily accumulates the voice packet 50 received, and the jitter measurer 22 calculates a jitter value from reception time information of the voice packet 50. The jitter value is compared with the number of accumulated packets (amount) of the receiving packet buffer 20, and a receiving buffer adjustment value 64a for increasing/decreasing the buffer accumulation amount as required is provided to the buffer controller 21. The buffer controller 21 provides a packet output request 52a to the receiving packet buffer 20, extracts the voice packet 50 temporarily accumulated in the buffer 20 to be provided to the voice output portion 40, thereby adjusting the number of accumulated packets (buffering amount) of the receiving packet buffer 20. Namely, the packet receiving device 100a monitors the jitter value, adaptively controls the buffer accumulation amount, and absorbs the delay fluctuation (jitter).

An example of a delay fluctuation absorbing device (packet receiving device) using a similar transmission delay fluctuation absorbing method can be mentioned in which a buffer temporarily accumulates a voice packet transmitted from a packet communication network, a delay fluctuation calculation means measures a delay fluctuation amount of the voice packet having arrived, a delay amount control means compares the measured delay fluctuation amount with a set delay setting value, instructs to increase a delay amount when the measured delay fluctuation amount exceeds the delay setting value by a predetermined value or more, and instructs to decrease the delay amount when the measured delay fluctuation amount falls short of the delay setting value by a predetermined value or more, a delay amount adjustment means repeatedly transmits a soundless voice packet upon reception of the instruction of increasing the delay amount, and discards the soundless voice packet upon reception of the instructions of decreasing the delay amount for adjusting (see e.g. patent document 1).

(2) Technology Accommodating to Clock Shift

FIG. 20 shows a prior art example (2) of a packet receiving device, and is provided with a receiving packet buffer 30, a buffer controller 31, and a number of accumulated packets monitor 32. The receiving packet buffer 30 temporarily accumulates the voice packet 50 received. The number of accumulated packets monitor 32 monitors the accumulation amount of the receiving packet buffer 30 as the number of accumulated packets (the number of packets accumulated by the receiving packet buffer 30), provides to the buffer controller 31 a receiving buffer adjustment value 64b indicating instructions of decreasing the number of accumulated packets by discarding the packet when the number of packets becomes equal to or more than a threshold value, and provides to the buffer controller 31 the receiving buffer adjustment value 64b indicating instructions of increasing the number of accumulated packets by repeatedly reproducing the packet (or inserting an interpolation packet) when the number of accumulated packets becomes equal to or less than a threshold value.

The buffer controller 31 provides a packet output request 52b to the receiving packet buffer 30 based on the instructions of the receiving buffer adjustment value 64b, replicates or discards the voice packet 50 accumulated in the receiving packet buffer 30, and suppresses the occurrence of the underflow and the overflow of the buffer 30.

An example of a packet receiving device of a similar method accommodating to a clock shift can be mentioned in which a buffer accumulates a voice signal, a voice detector detects voiced/voiceless information indicating a voiced/voiceless section of the voice signal, a buffer monitor motors an accumulation amount of the voice signal accumulated in the buffer. The buffer controller inserts a new voice signal into the voice signal accumulated in the buffer or discards the voice signal accumulated based on the accumulation amount and the voiced/voiceless information (see e.g. the patent document 2).

[Patent document 1] Japanese Patent Application Laid-open No. 2001-160826 (page 2, FIG. 1)

[Patent document 2] Japanese Patent Application Laid-open No. 2003-46490 (page 2, FIG. 1)

FIG. 21 shows a variation of the number of accumulated packets of the receiving packet buffer resulting from a jitter and a clock shift. In an actual system environment, it is general that the jitter and the clock shift occur at the same time, and a steady buffer variation (see D1 and D2 of FIG. 21) due to the clock shift and a momentary buffer variation (see point t1) due to the jitter are combined, so that the buffering amount varies. Namely, the buffering amount (average) is gradually reduced due to the clock shift, and the buffering amount momentarily varies due to the jitter (see point t1), whereby a buffer underflow c7 frequently occurs.

Hereinafter, problems of the packet receiving device 100a and the packet receiving device 10b respectively shown in the prior art examples (1) and (2) of FIGS. 19 and 20 will be described.

FIG. 22 shows the number of accumulated packets in the packet receiving device 100a of the prior art example (1). While FIG. 16B shows the number of accumulated packets in case where only the jitter (transmission delay fluctuation) occurs, in FIG. 22 the clock shift further occurs and the number of accumulated packets is gradually reduced (see D3 and D4). Although the packet receiving device 100a adjusts the initial value (reference value) at the point t1 when the jitter varies to accommodate to the jitter variation (see E4), it does not accommodate to the clock shift. Therefore, buffer underflows c8 and c9 occur. If the packets in which the underflows have occurred are in the voice section, the sound quality significantly deteriorates.

Namely, by the method of calculating the jitter from the reception time information of the received packet, a clock shift having a steady fixed shift component can not be detected. Therefore, the adjustment amount of the jitter becomes inaccurate, and an excess and a deficiency of the jitter adjustment occur.

FIG. 23 shows the number of accumulated packets in the packet receiving device 100b of the prior art example (2). While FIG. 18B shows the number of accumulated packets in case where only the clock shift occurs, FIG. 23 shows the number of accumulated packets in case where the jitter further occurs. Although the packet receiving device 100b adjusts the buffering amount at points t1-t4, and t6-t9 to accommodate to the clock shift, it does not accommodate to the jitter variation. Therefore, a buffer overflow c10 and a buffer underflow c11 occur after the point t5 when the jitter largely varies.

Namely, the number of accumulated packets (buffering amount) of the receiving packet buffer 10 varies including "momentary variation due to jitter" and "steady variation due to clock shift". Therefore, when the number of accumulated packets (momentary value) of the receiving packet buffer 10 is used as the control parameter as shown in the prior art example (2), it is not possible to distinguish whether the buffer variation at the point exceeding a control threshold value is resulting from the jitter or the clock shift. Steady buffer adjustment processing for maintaining the buffering amount fixed is required for the clock shift causing the steady buffer variation, while buffering amount adjustment processing for increasing/decreasing the buffering amount is required for the jitter causing the momentary buffer variation, and both buffer adjustment processings are different from each other.

Accordingly, when the variation of the number of accumulated packets by both processings is applied in a unified way, a stable buffer control can not be performed, so that there is a possibility of reversely causing the sound quality deterioration by the excessive buffer control. For example, when the buffering amount is momentarily reduced below a certain threshold value by a negative (delay) jitter, the processing of increasing the initial value (reference value) of the buffering amount is performed in the prior art example (2). However, hereafter, when the voice packets delayed by the jitter sequentially arrive all at once, the voice packets having arrived will be further accumulated to the buffering amount increased by the buffer control, whereby there is a possibility that the overflow c10 of the buffer is induced.

SUMMARY OF THE INVENTION

It is accordingly an object of the present invention to provide a packet receiving device and method which convert a voice packet received into a voice and which perform an optimum receiving packet buffer control for securing stable sound quality in an environment where both of a jitter and a clock shift between a transmitting device and a receiving device occur.

In order to achieve the above-mentioned object, the packet receiving method according to the present invention comprises: a first step of temporarily storing a voice packet received; a plurality of second steps of respectively determining different buffer adjustment values for determining a buffering amount of a receiving packet buffer based on one or more pieces of parameter information obtained from the voice packet temporarily stored; a third step of determining a receiving buffer adjustment value from the plural buffer adjustment values; and a fourth step of controlling the buffering amount based on the receiving buffer adjustment value.

Also, in the present invention according to the above-mentioned present invention, the parameter information may further include one or more pieces of parameter information which can be obtained from a packet receiving device itself.

Also, the present invention according to the above-mentioned present invention may further comprise a fifth step, between the third step and the fourth step, of determining whether or not a voice is included in the voice packet temporarily stored, and the fourth step may comprise controlling the buffering amount based on a determination result of the fifth step in addition to the receiving buffer adjustment value.

Also, in the present invention according to the above-mentioned present invention, the fourth step may comprise monitoring an actual value of the receiving buffer adjustment value, and the third step may comprise determining the receiving buffer adjustment value by adding the actual value to the buffer adjustment values.

Furthermore, in the present invention according to the above-mentioned present invention, the parameter information may comprise an arrival time of the voice packet, a number of voice packets stored in the receiving packet buffer, and a sequence number indicating a transmission order of the voice packets.

A packet receiving device of the present invention for realizing the above-mentioned method of the present invention comprises: a receiving packet buffer which temporarily stores a voice packet received; a plurality of parameter information monitors which respectively determine different buffer adjustment values for determining a buffering amount of the receiving packet buffer based on one or more pieces of parameter information obtained from the voice packet temporarily stored; a buffer adjustment value determiner which determines a receiving buffer adjustment value from the buffer adjustment values; and a buffer controller which controls the buffering amount based on the receiving buffer adjustment value.

Hereinafter, the present invention will be described referring to figures.

FIG. 1 shows a principle of a packet receiving device 100 according to the present invention. This packet receiving device 100 is provided with a receiving packet buffer 10, a plurality of parameter information monitors 14, 15, . . . , 16, a buffer adjustment value determiner 17, and a buffer controller 11. A reference numeral 12 indicates a voice output portion.

The receiving packet buffer 10 temporarily stores a voice packet 50 received from e.g. a VoIP network (not shown). This voice packet 50 includes a jitter. Also, there is a clock shift between a clock on a transmitting side and a clock of the voice output portion 12. The parameter information monitors 14, 15, . . . , 16 respectively determine different buffer adjustment values (i.e. a first buffer adjustment value 61, a second buffer adjustment value 62, . . . , an n-th buffer adjustment value 63) for determining the buffering amount of the receiving packet buffer 10 based on one or more pieces of parameter information (e.g. information concerning jitter or clock shift, or the like) obtained from the voice packet 50 temporarily stored.

The buffer adjustment value determiner 17 determines a receiving buffer adjustment value 64 in which the buffer adjustment values are integrated based on the buffer adjustment values 61, 62, . . . , 63 determined by the parameter information monitors 14, 15, . . . , 16. Based on this receiving buffer adjustment value 64, the buffer controller 11 adjusts the buffering amount of the receiving packet buffer 10, e.g. the number of voice packets 50 temporarily accumulated in the receiving packet buffer 10.

Thus, it becomes possible to perform a control corresponding to the jitter resulting from the network state or the like and the clock shift between the packet transmitting device and the packet receiving device respectively, i.e. an optimum receiving packet buffer control for securing the stable sound quality.

Also, in the present invention according to the above-mentioned invention, the parameter information may further include one or more pieces of parameter information which can be obtained from the packet receiving device itself.

Namely, it is possible to include predetermined parameter information obtained on a packet receiving device side, e.g. reproduced clock information, in addition to the parameter obtained from the voice packet temporarily stored, as the parameter information.

By the parameter information, the parameter information monitor can obtain more accurate clock shift.

Also, the present invention according to the above-mentioned invention may further comprise a voice determiner which determines whether or not a voice is included in the voice packet temporarily stored in the receiving packet buffer, and the buffer controller may control the buffering amount based on a determination result of the voice determiner in addition to the receiving buffer adjustment value.

Namely, a voice determiner (not shown) determines whether the packet temporarily stored in the receiving packet buffer 10 is a voice packet including a voice or a voice packet without a voice, and provides the determination result to the buffer controller 11. When the voice packet is required to be discarded based on the receiving buffer adjustment value, the buffer controller 11 discards the voice packet in a non-voice section. When the voice packet is required to be repeatedly reproduced, the controller 11 reproduces the voice packet in a non-voice section. Thus, the voice packets within a voice discarded or repeated in a voice communication are reduced, thereby enabling a reproduction of the voice communication with a secured second quality.

Also, in the present invention according to the above-mentioned invention, the buffer controller may monitor an actual value of the receiving buffer adjustment value, and the buffer adjustment value determiner may determine the receiving buffer adjustment value by adding the actual value to the buffer adjustment values.

Namely, the buffer controller controls the buffering amount of the receiving packet buffer based on the receiving buffer adjustment value. However, since the control is not always performed as indicated by the receiving buffer adjustment value, the buffer controller monitors its actual value. The buffer adjustment value determiner determines the receiving buffer adjustment value based on both of the actual value and a plurality of buffer adjustment values.

Thus, even when a sufficient non-voice section can not be secured and the buffer control for the receiving buffer adjustment value set can not be performed for example, the adjustment of the required buffering amount can be reliably performed by using the subsequent control section.

Also, in the present invention according to the above-mentioned invention, the parameter information may comprise an arrival time of the voice packet, a number of voice packets stored in the receiving packet buffer, and a sequence number indicating a transmission order of the voice packets.

Also, in the present invention according to the above-mentioned invention, the parameter information obtained from the packet receiving device itself may comprise reproducing clock information.

Also, in the present invention according to the above-mentioned invention, the parameter information monitors may include a jitter monitor which determines a jitter buffer adjustment value corresponding to a jitter of the voice packet, and a clock shift monitor which determines a clock shift buffer adjustment value corresponding to a clock shift. Thus, the buffer control accommodating to the jitter and the clock shift becomes possible.

Also, in the present invention according to the above-mentioned invention, the jitter monitor may be composed of a jitter calculator which calculates a jitter value of the voice packet, and a jitter buffer adjustment value setter which sets a jitter buffer adjustment value corresponding to the jitter value.

Also, in the present invention according to the above-mentioned invention, the jitter calculator may obtain the jitter value by using a sequence number of the voice packet received, a reception time, a number of accumulated packets upon reception.

Also, in the present invention according to the above-mentioned invention, the clock shift monitor may be composed of a clock shift calculator which calculates a clock shift indicating a change characteristic of a steady number of accumulated packets of the receiving packet buffer, and a buffer adjustment value setter which sets a buffer adjustment value corresponding to the clock shift calculated.

Also, in the present invention according to the above-mentioned invention, the clock shift calculator may obtain the clock shift by using an average of a number of accumulated packets upon reception of the voice packet.

Also, in the present invention according to the above-mentioned invention, the clock shift monitor may be provided with an average reception interval calculator which calculates a packet average reception interval indicating an average reception time interval based on reception time information of the voice packet, an average reproduction interval calculator which calculates an average reproduction interval indicating an average output time interval from a receiving buffer of the voice packet based on reproducing clock information, a clock shift calculator which calculates a clock shift between a transmitting device and the receiving device based on the packet average reception interval and the average reproduction interval, and a clock shift buffer adjustment value setter which sets a clock shift buffer adjustment value corresponding to the clock shift.

Also, in the present invention according to the above-mentioned invention, the average reception interval calculator may calculate the packet average reception interval based on reception time information of the voice packet received.

Also, in the present invention according to the above-mentioned invention, the average reproduction interval calculator may calculate the average reproduction interval based on reproducing clock information.

Also, in the present invention according to the above-mentioned invention, the buffer controller may discard the voice packet or repeatedly perform output processing based on the receiving buffer adjustment value, and may increase or decrease the buffering amount.

Also, in the present invention according to the above-mentioned invention, when the buffering amount is increased based on the receiving buffer adjustment value, the buffer controller may use an interpolation packet generated from the preceding and subsequent voice packets by interpolating.

Also, in the present invention according to the above-mentioned invention, the buffer controller may discard the voice packet or repeatedly perform output processing only to the voice packet in a non-voice section determined by the voice determiner based on the receiving buffer adjustment value, and may increase or decrease the buffering amount.

Furthermore, in the present invention according to the above-mentioned invention, the parameter information monitors may change a monitor time interval of each parameter information according to a transmission line state.

In order to achieve the above-mentioned object, a clock shift monitor according to the present invention comprises: an average reception interval calculator which calculates a packet average reception interval indicating an average reception time interval of a voice packet based on reception time information of the voice packet; an average reproduction interval calculator which calculates an average reproduction interval indicating an average output time interval of the voice packet based on reproducing clock information; a clock shift calculator which calculates a clock shift between a transmitting device and a receiving device based on the packet average reception interval and the average reproduction interval; and a clock shift buffer adjustment value setter which sets a clock shift buffer adjustment value corresponding to the clock shift.

As described above, according to the packet receiving method and device according to the present invention, a momentary variation of a buffering amount due to a jitter, and a steady variation of a buffering amount due to a clock shift are independently monitored, and optimum buffer adjustment values are set for each variation, whereby stable sound quality can be secured without occurrence of a buffer underflow or overflow even when the jitter and the clock shift occur at the same time.

Also, by obtaining a clock shift by using a reproduced clock of the packet receiving device itself in addition to parameter information of the received packet, more accurate clock shift can be obtained even when the momentary buffer variation due to the jitter is large. Thus, on the condition that the larger jitter occurs, the adjustment of the buffering amount can be reliably performed before the occurrence of the buffer underflow or overflow due to the clock shift, without an influence of the momentary buffer variation.

Also, by adjusting the buffering amount by using the non-voice section (non-voice packet), the deterioration of the sound quality which occurs by a packet discard or a repeated reproduction upon the buffer adjustment can be suppressed.

Also, the number of packets to which the adjustment for the receiving buffer adjustment value has actually completed is used as an actual value for the control parameter of the receiving buffer adjustment value in a subsequent section, whereby a required buffer adjustment can be reliably performed by using the subsequent control section even when a sufficient voiceless section can not be secured and the receiving buffer adjustment value set can not be satisfied.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 9A and 9B are diagrams showing an example (1) of a buffering amount variation in a receiving packet buffer of a packet receiving device according to the present invention;

FIG. 10 is a diagram showing an example (2) of a buffering amount variation in a receiving packet buffer of a packet receiving device according to the present invention;

FIGS. 16A and 16B are diagrams showing a buffering amount variation resulting from a jitter in a prior art packet receiving device;

FIGS. 18A and 18B are diagrams showing a buffering amount variation resulting from a clock shift in a prior art packet receiving device;

DESCRIPTION OF THE EMBODIMENTS

Figure 1:
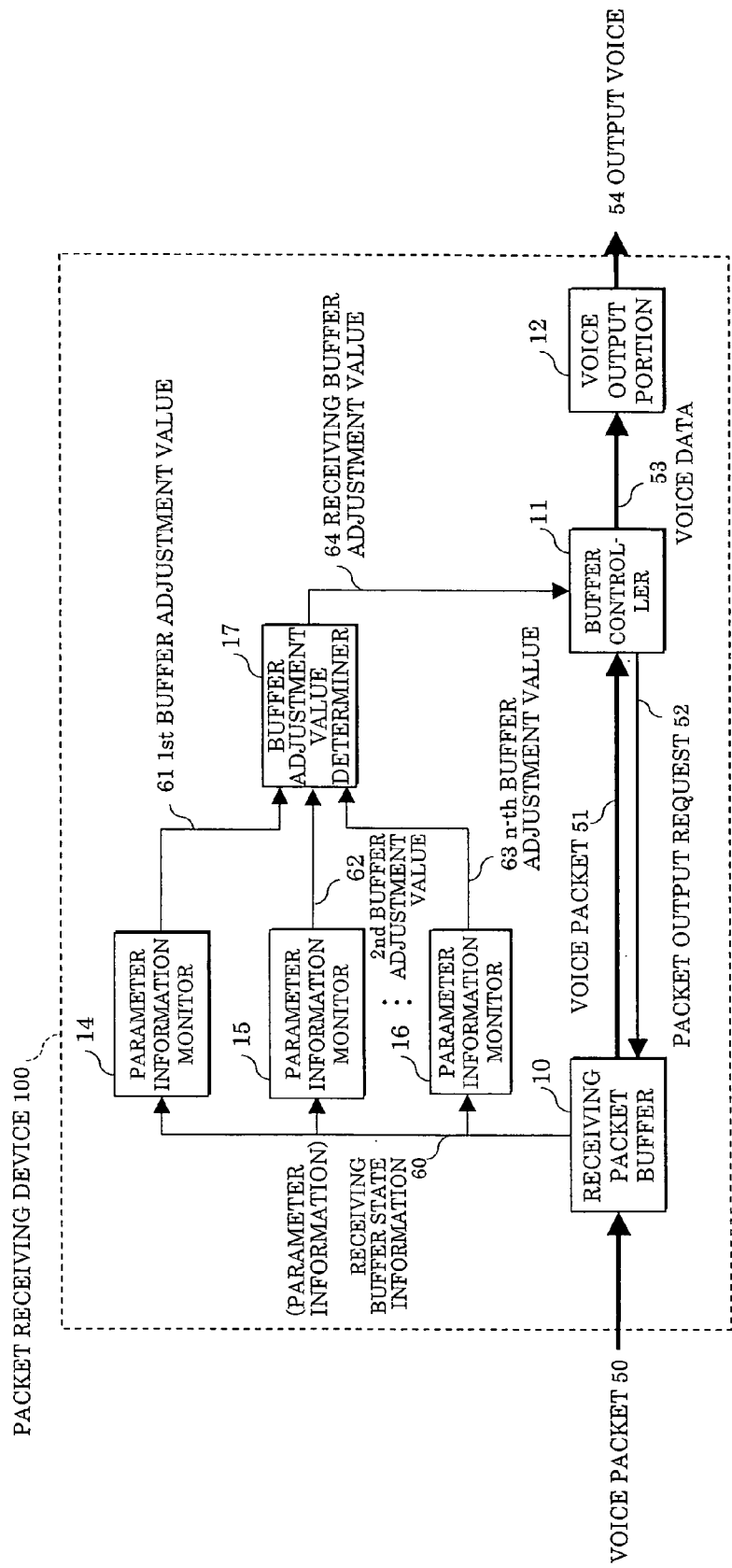
FIG. 1 is a block diagram showing a principle of a packet receiving device which realizes a packet receiving method according to the present invention.

Embodiments (1)-(4) of a packet receiving device for realizing a packet receiving method according to the present invention will now be respectively described referring to packet receiving devices $100w$-$100z$ (hereinafter, occasionally represented by a reference numeral 100). This packet receiving device 100 receives the voice packet (hereinafter, occasionally abbreviated as rpk(n); n is transmission voice packet No., n=0, 1, . . . ) 50. This voice packet 50 is formed of voice data packetized at fixed intervals by e.g. a voice packet transmitting device (not shown) and the voice data are transmitted to the packet receiving device 100 through a VoIP network (not shown). In the rpk(n) 50, a jitter occurs. Also, it is supposed that there is a slight frequency shift between a transmitting side clock and a receiving side clock.

In the embodiments (1)-(4), it is supposed that there is no loss or an order change of the rpk(n) 50 between the voice packet transmitting device and the packet receiving device 100 for simplifying the description.

Embodiment (1)

Jitter and Clock Shift

Figure 2:
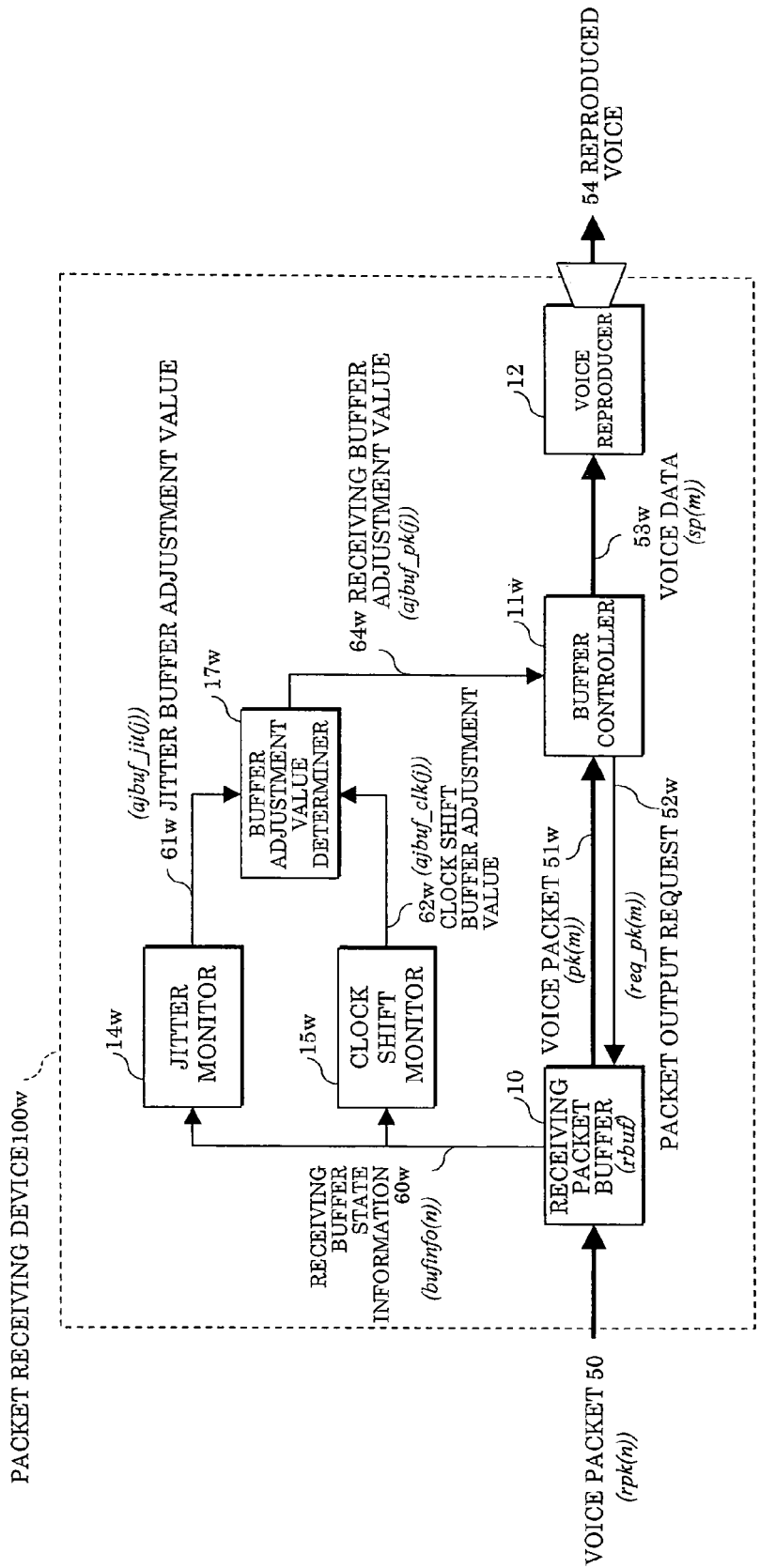
FIG. 2 is a block diagram showing an embodiment (1) of a packet receiving device according to the present invention.

FIG. 2 shows a packet receiving device 100w indicating the embodiment (1) according to the present invention. This packet receiving device 100w is composed of the receiving packet buffer 10, a buffer controller 11w, the voice reproducer 12, a jitter monitor 14w, a clock shift monitor 15w, and a buffer adjustment value determiner 17w. By sequentially indicating operation of each functional portion, a processing flow of the voice packet (hereinafter, occasionally abbreviated as rpk(n); n=0, 1, . . . ) 50 in the packet receiving device 100w will now be described.

Receiving Packet Buffer (Hereinafter, Occasionally Abbreviated as rbuf) 10

It is supposed that the size of the rbuf 10 (the number of voice packets storable by rbuf 10)=rbufsize has a variable length and can be set to an appropriate value according to jitters. Supposing that an npk is the number of voice packets stored in the rbuf 10, it is obtained that 0≦npk≦rbufsize. The rbuf 10 sequentially receives the rpk(0) 50-rpk(n) 50 through the VoIP network. If the npk-th voice packet stored in the rbuf 10 is supposed to be an rbuf(npk) and when the rbuf 10 receives the rpk(n), the following equations (1) and (2) are held:

$$rbuf(npk)=rpk(n) \quad \text{Eq. (1)}$$

$$npk=npk+1 \quad \text{Eq. (2)}$$

Also, the rbuf 10 outputs receiving buffer state information (hereinafter, occasionally abbreviated as bufinfo) 60w to the jitter monitor 14w and the clock shift monitor 15w. The bufinfo 60w is information concerning the rpk(0)-rpk(n) 50 which can be obtained by the rbuf 10, and includes the bufinfo (0)-bufinfo(n) respectively corresponding to the rpk(0)-rpk (n). The rpk(n) 50 includes packet header information in which information necessary for the transmission is stored in addition to the voice data. Since an RTP (real-time transport protocol) packet is generally used in the VoIP communication, e.g. a sequence No. (hereinafter, occasionally abbreviated as seq(n)) can be obtained from the header information. In this embodiment (1), a reception time=rtime(n) upon reception of the rpk(n) 50, the number of voice packets (=npk; hereinafter, referred to as the number of accumulated packets) (hereinafter, occasionally abbreviated as nbuf(n)) accumulated in the rbuf 10, and the seq(n) are used as the bufinfo(n).

After a packet reception start, when the nbuf(n)=npk reaches the initial value ref_npk (hereinafter, occasionally referred to as buffer reference value of rbuf 10) preset, the outputting of the old rbuf(0)=rpk(0) (sequence No. is the smallest) is started to the buffer controller 11w as indicated by the following equations as the voice packet (hereinafter, occasionally abbreviated as pk(m); m=number of reproduced frames, 0, 1, . . . ), and the receiving packet buffer 10 is updated every output:

$$pk(m)=rbuf(0) \quad \text{Eq. (3)}$$

$$npk=npk-1 \quad \text{Eq. (4)}$$

$$rbuf(k)=rbuf(k+1) \quad \text{Eq. (5)}$$

wherein k=0, . . . , npk

Outputting the pk(m) is performed at regular intervals t_play synchronized with the reproduced clock. Also, the value of the ref_npk is appropriately set according to the jitter value under the condition of 0<ref_npk<rbufsize. In an ideal condition without jitter or clock shift, the number of voice packets npk stored in the rbuf 10 is always ref_npk (buffer reference value).

Jitter Monitor 14w

Figure 3:
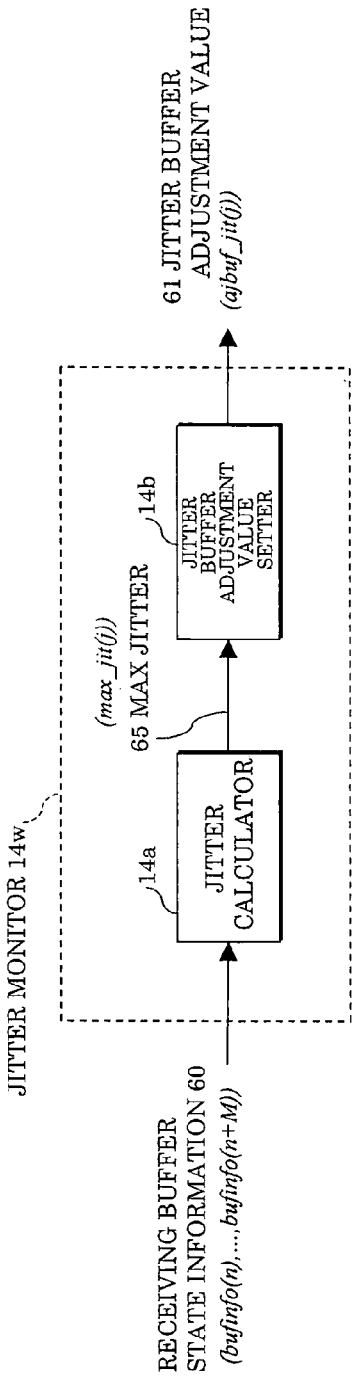
FIG. 3 is a block diagram showing an embodiment of an arrangement of a jitter monitor in a packet receiving device according to the present invention.

FIG. 3 shows an embodiment of an arrangement of the jitter monitor 14w, which is composed of a jitter calculator 14a and a jitter buffer adjustment value setter 14b. The jitter calculator 14a calculates the maximum jitter (hereinafter, occasionally abbreviated as max_jit(j); j=jitter monitoring section No.) 65 in a section "t" by using a plurality of pieces of receiving buffer state information 60=bufinfo(n) . . . bufinfo(n+M) received at regular intervals of section "t", and provides this max_jit(j) 65 to the jitter buffer adjustment value setter 14b.

Figure 4:
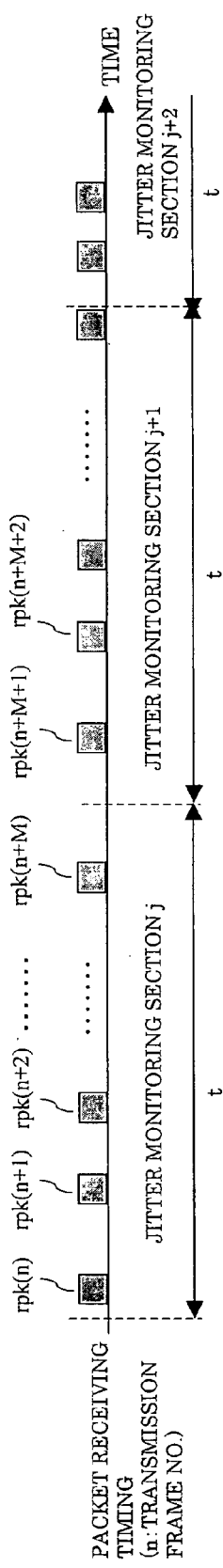
FIG. 4 is a diagram showing a relationship between a packet receiving timing and a jitter monitor section in a packet receiving device according to the present invention.
Figure 14:
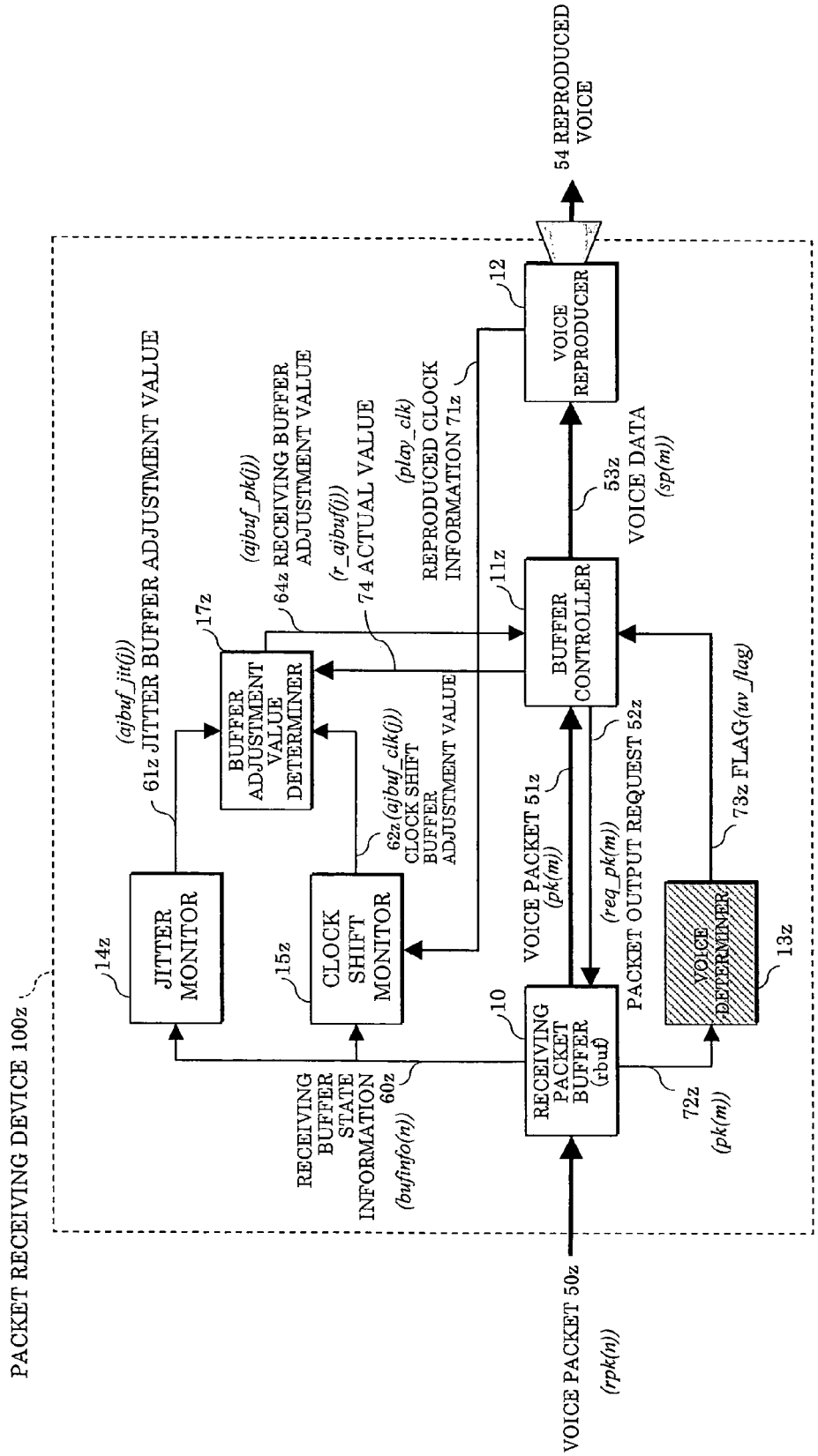
FIG. 14 is a block diagram showing an embodiment (4) of a packet receiving device according to the present invention.
Figure 15:
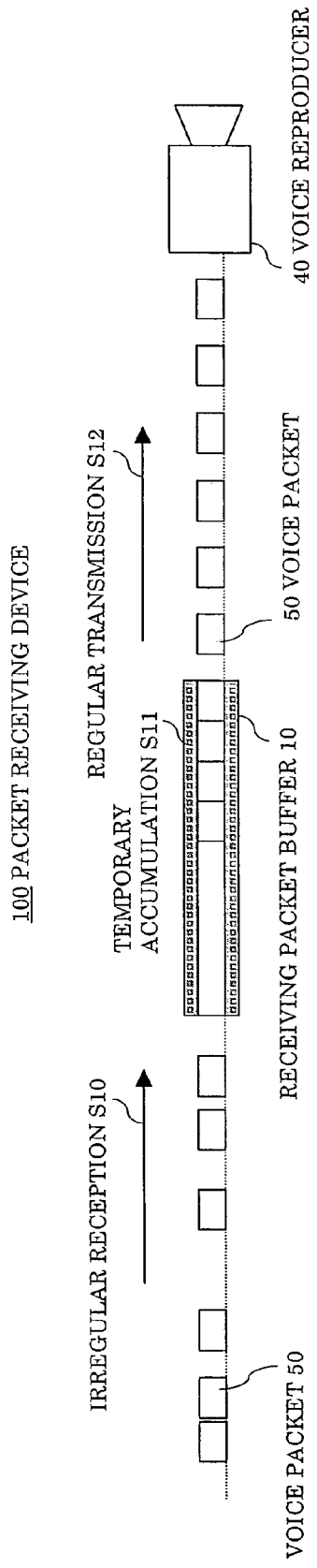
FIG. 15 is a block diagram showing an absorbing principle of a voice packet transmission delay fluctuation (jitter) in a receiving packet buffer of a general packet receiving device.
Figure 17:
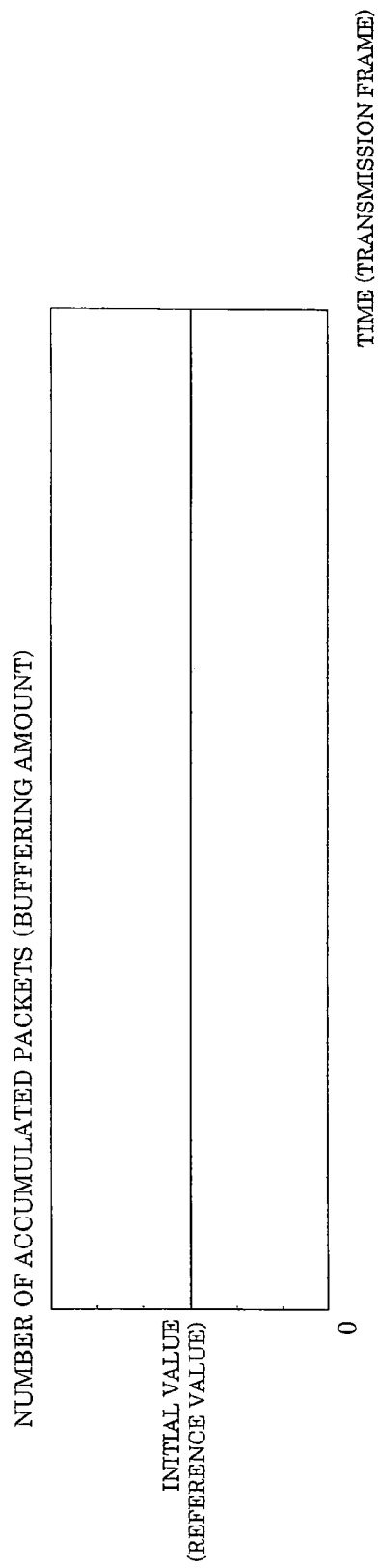
FIG. 17 is a diagram showing an ideal state of a buffering amount in a receiving packet buffer of a general packet receiving device.
Figure 19:
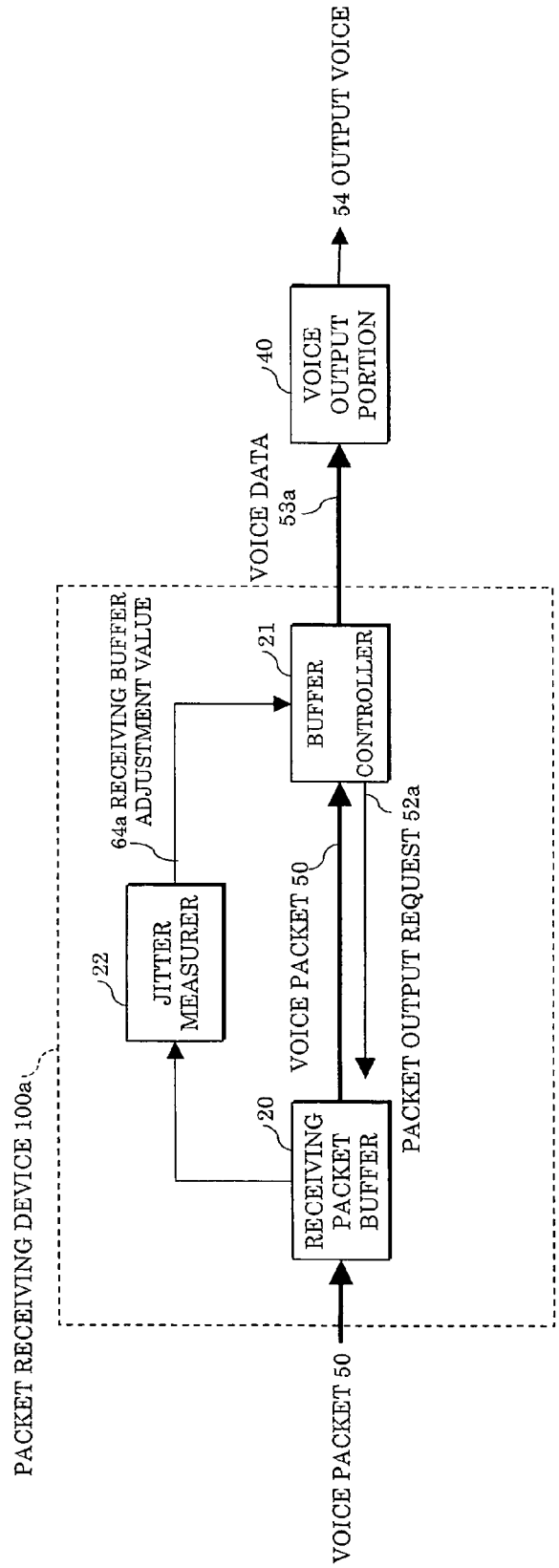
FIG. 19 is a block diagram showing an arrangement (1) of a prior art packet receiving device.
Figure 20:
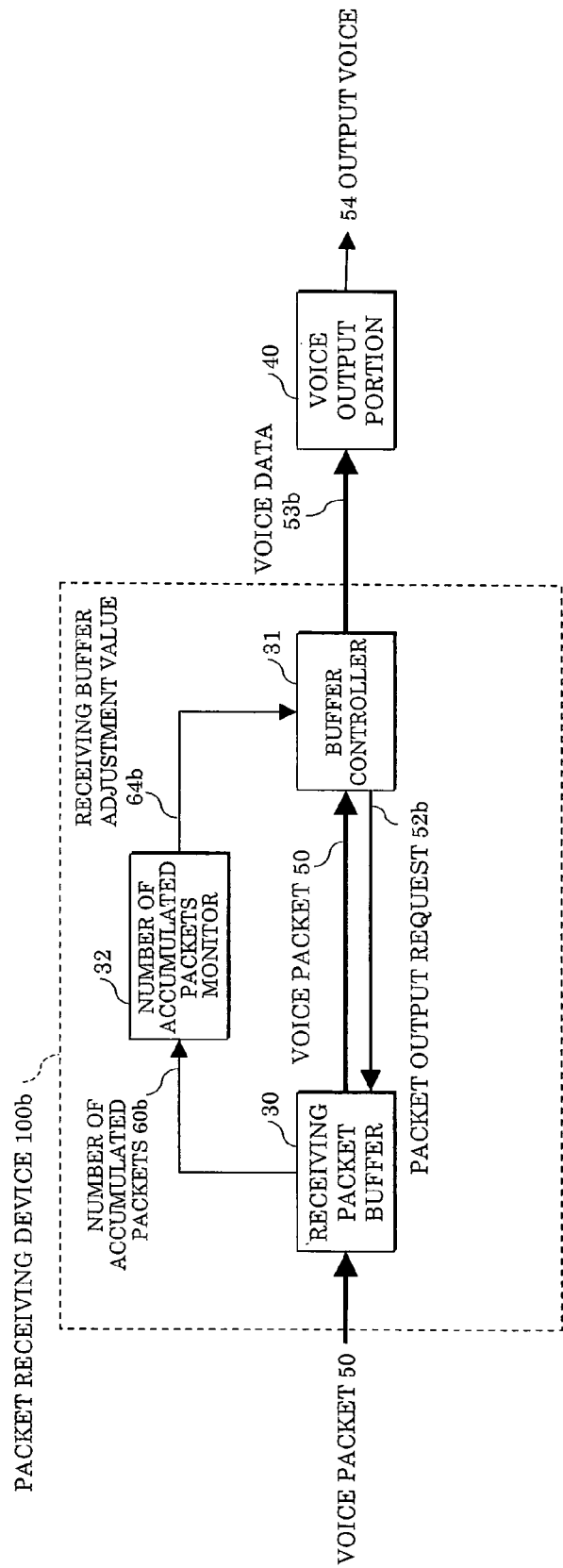
FIG. 20 is a block diagram showing an arrangement (2) of a prior art packet receiving device.
Figure 21:
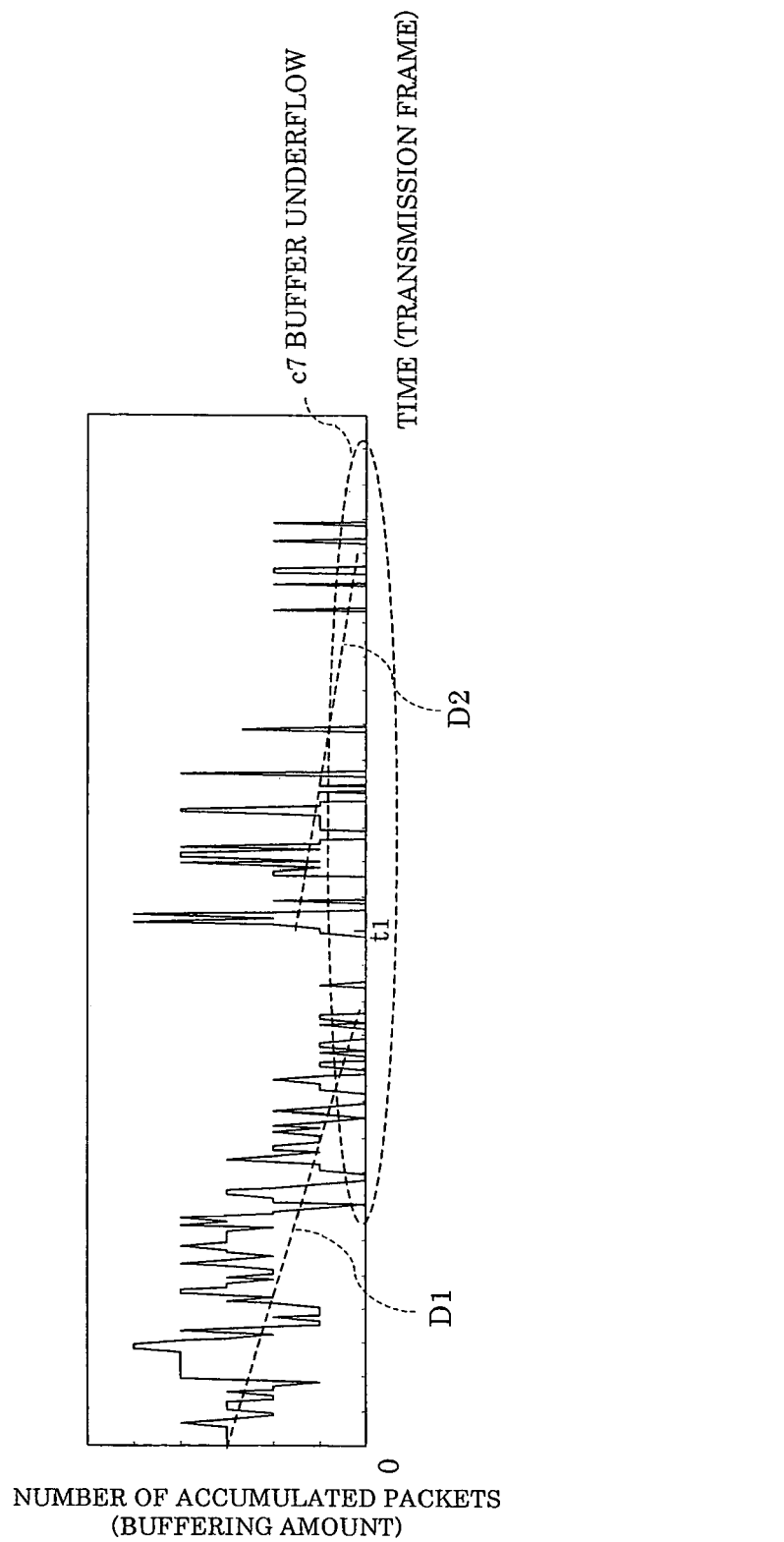
FIG. 21 is a diagram showing a buffering amount variation resulting from a jitter and a clock shift in a general packet receiving device.
Figure 22:
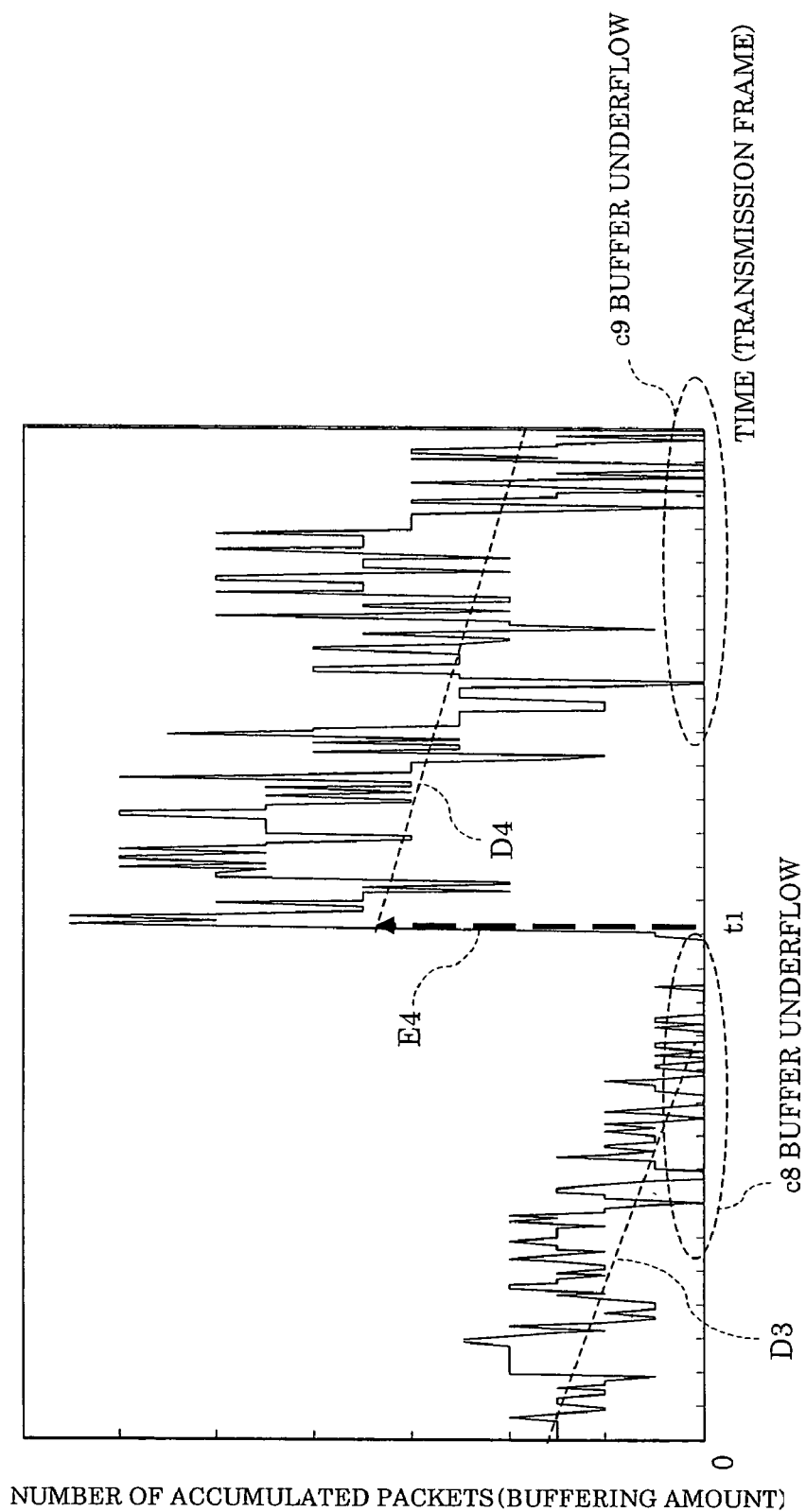
FIG. 22 is a diagram showing a buffering amount variation in a prior art packet receiving device only accommodating to a jitter.
Figure 23:
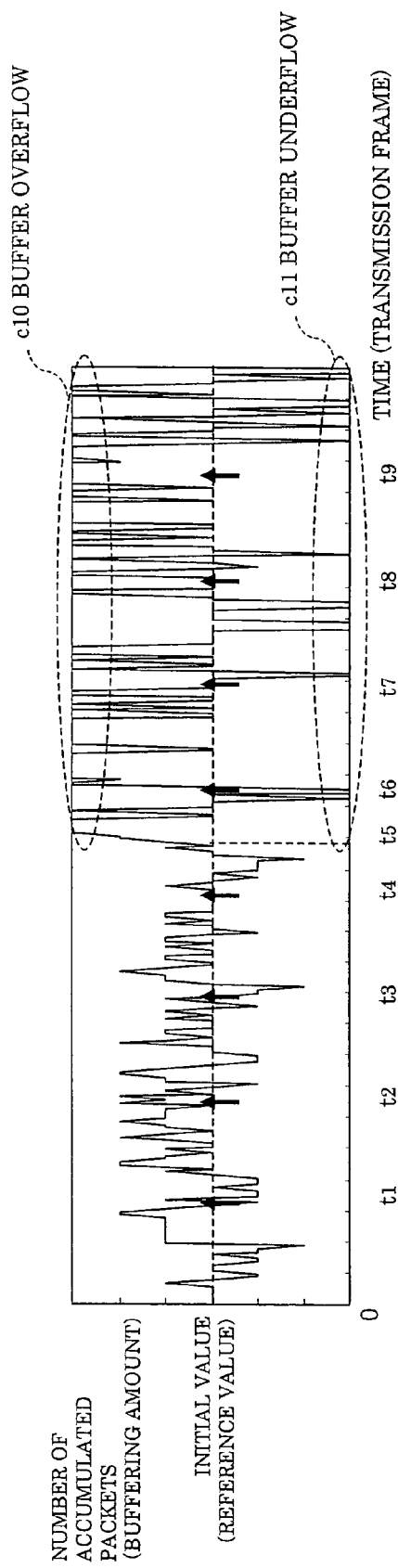
FIG. 23 is a diagram showing a buffering amount variation in a prior art packet receiving device only accommodating to a clock shift.

FIG. 4 shows an example of the jitter monitoring section calculating the max_jit(j) 65 and the receiving timing of the voice packet. In FIG. 4, the time t of e.g. the jitter monitoring section No. 65=j includes "M+1" units of npk(n)-npk(n+M) 65, and can monitor the bufinfo(n) 60-bufinfo (n+M) 60 respectively corresponding to the npk(n)-npk(n+M). Generally, a jitter can be obtained by a dispersion characteristic of the packet reception interval by using the reception time=rtime(n) (wherein n=0, 1, 2, . . . ) of the npk(n) included in e.g. the bufinfo(n). While a calculation interval "t" of the jitter is arbitrary, the time "t" is set so that a plurality of npk(n)'s may be included in the time "t" as shown in FIG. 14.

The jitter buffer adjustment value setter 14b determines the minimum buffer adjustment value per packet required for absorbing the jitter according to the max_jit(j) 65 as the first buffer adjustment value (hereinafter, occasionally abbreviated as ajbuf_jit(j)). In this embodiment (1), the buffer reference value (ref_npk per packet) is updated in accordance with the max_jit(j) measured in ms by using e.g. the following equation (6), and determines the buffer adjustment value (hereinafter, occasionally abbreviated as ajbuf_jit(j)) so that the buffering amount may assume the reference value (initial value) by using the following equation (7), wherein "t_send" is a frame length measured in ms of the voice data included in a single packet, and "ave_npk(j)" is an average of the receiving buffering amount in the present monitoring section "j":

$$ref\_npk=1+\max\_jit/t\_send \quad \text{Eq. (6)}$$

$$ajbuf\_jit(j)=ref\_npk\cdot ave\_npk(j) \quad \text{Eq. (7)}$$

Figure 5:
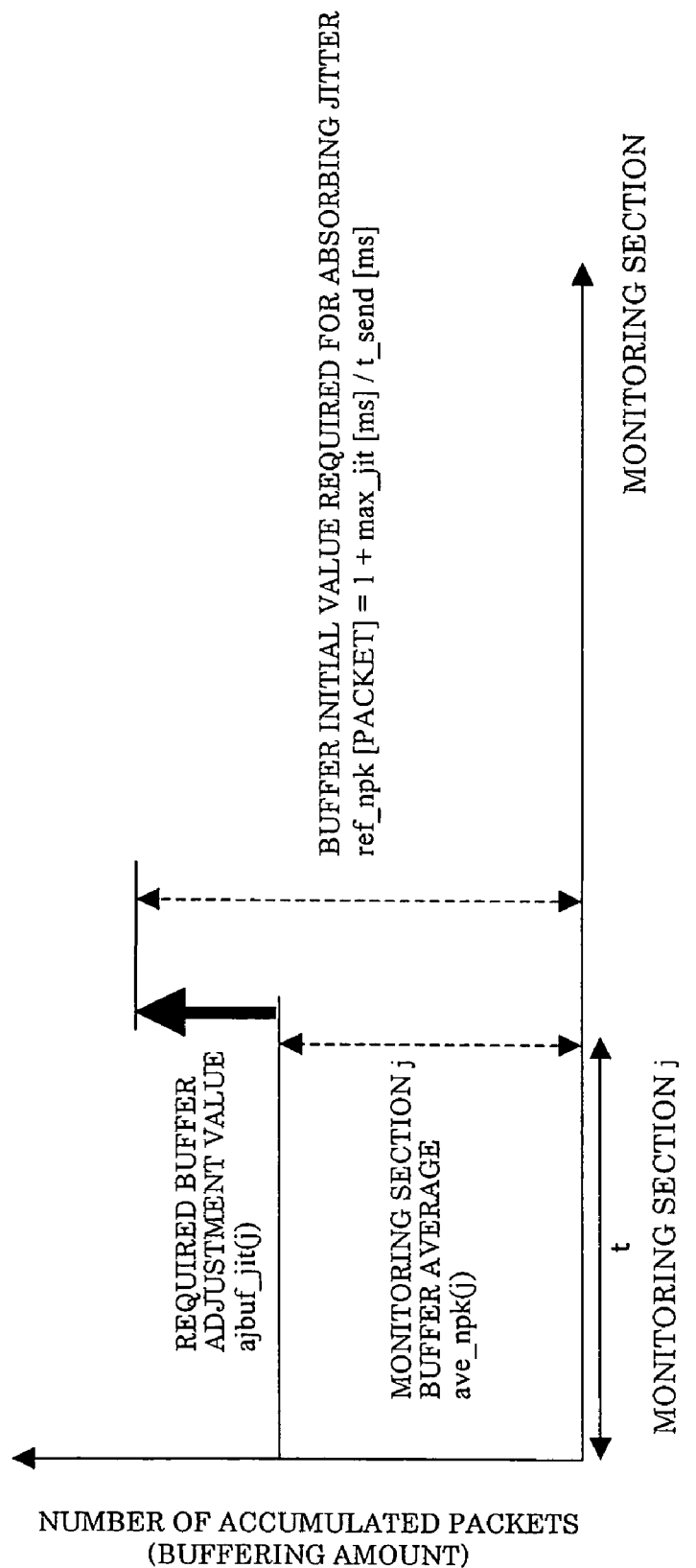
FIG. 5 is a diagram showing a calculation concept of a jitter buffer adjustment value in a jitter monitor of a packet receiving device according to the present invention.

In FIG. 5, the relationships between the ave_npk(j), the ref_npk, and the ajbuf_jit(j) are shown in order to facilitate the understanding of the above-mentioned equation (7). This ajbuf_jit(j) is provided to the buffer adjustment value determiner 17w.

Clock Shift Monitor 15w

Figure 6:
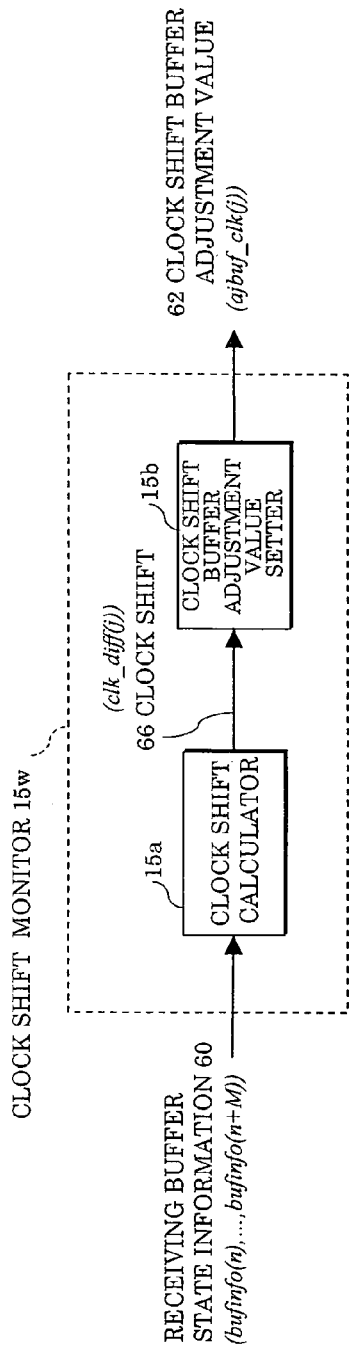
FIG. 6 is a block diagram showing an embodiment of an arrangement of a clock shift monitor in the embodiment (1) of a packet receiving device according to the present invention.

FIG. 6 shows an embodiment of an arrangement of the clock shift monitor 15w, which is composed of a clock shift calculator 15a and a clock shift buffer adjustment value setter 15b.

Figure 7:
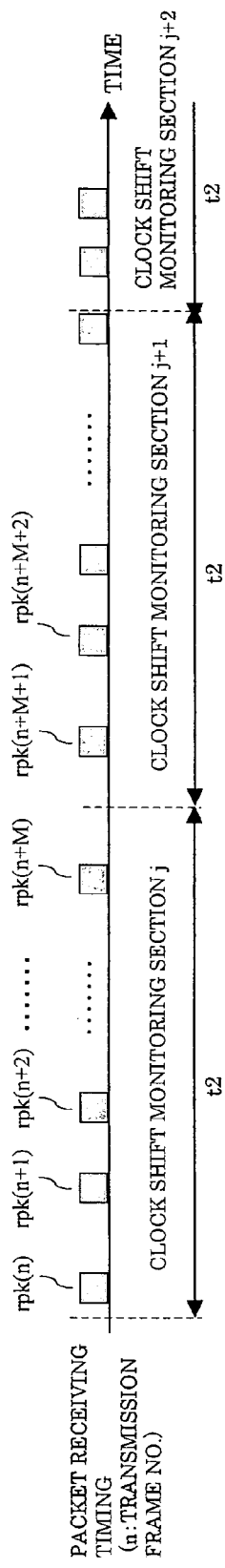
FIG. 7 is a diagram showing a relationship between a packet receiving timing and a clock shift monitor section in a packet receiving device according to the present invention.

FIG. 7 shows the relationship between the packet receiving timing and the clock shift monitoring sections by the clock shift monitor 15w. Referring to FIG. 7, the operation of the clock shift monitor 15w will now be described.

The clock shift calculator 15a calculates a clock shift (hereinafter, occasionally abbreviated as clk_diff(j); "j" is monitoring section) in clock shift monitoring sections j, j+1, . . . of the regular interval t2. For example, the clock shift calculator 15a monitors the bufinfo(n) 60-bufinfo(n+M) 60

(see FIG. 6) respectively corresponding to the rpk(n)-rpk(n+M) received in the clock shift monitoring section "j", and calculates the clk_diff(j) based on the information included in the bufinfo(n) 60-bufinfo(n+M) 60.

In this embodiment (1), the clk_diff(j) is obtained by using the buffering amount (hereinafter, occasionally abbreviated as nbuf(n); n=0, 1, 2, . . . ) upon reception of the packet as shown by the following equation (8) as a change amount (steady buffer variation characteristic) of the average per unit time. An ave_nbuf (j−1) and the clk_diff(j−1) are respectively the average of the receiving buffering amounts and the clock shift at a previous (past) monitoring section j−1:

$$clk\_diff(j)=clk\_diff(j-1)+\{ave\_nbuf(j)-ave\_nbuf(j-1)\} \quad \text{Eq. (8)}$$

Figure 8:
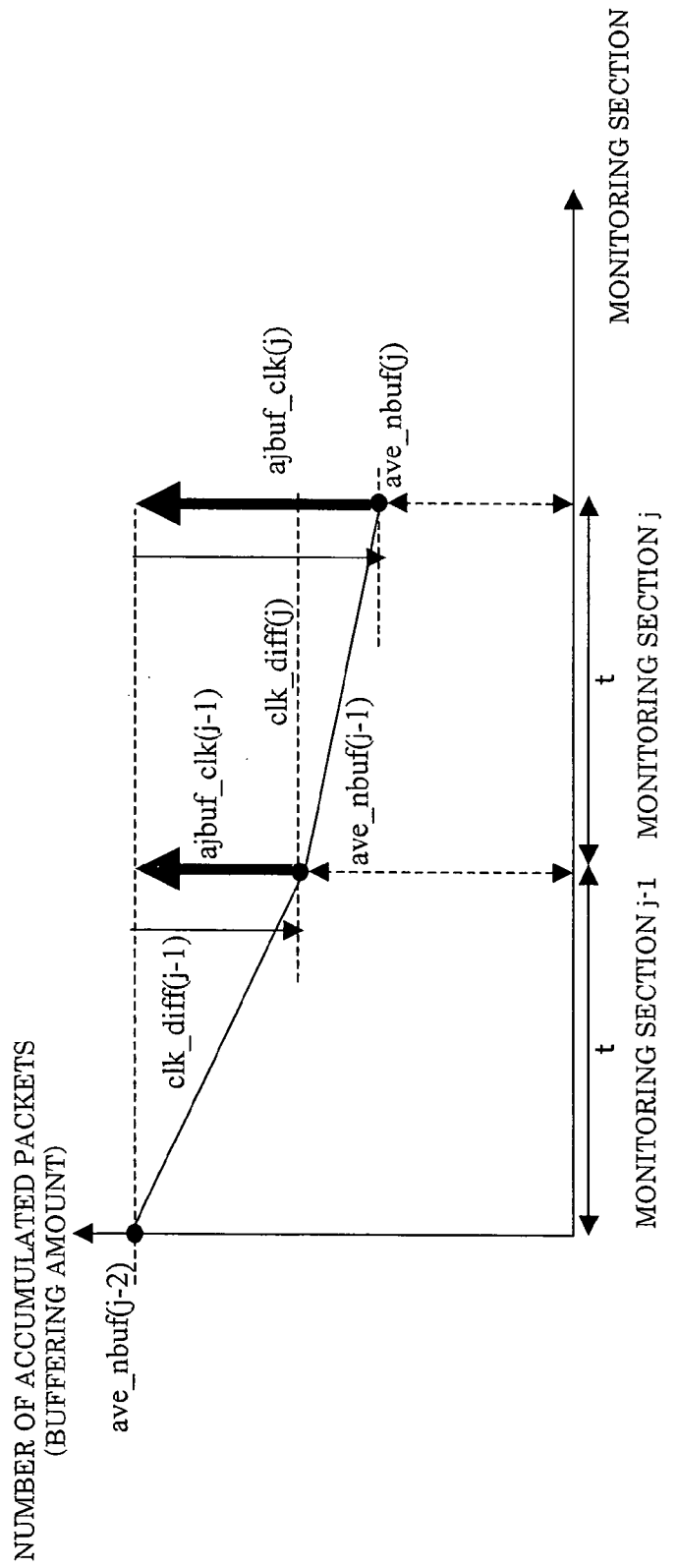
FIG. 8 is a diagram showing a calculation concept of a clock shift buffer adjustment value in a clock shift monitor of a packet receiving device according to the present invention.

In FIG. 8, the relationships between the clk_diff(j), the clk_diff(j−1), the ave_nbuf(j), and the ave_nbuf(j−1) are shown in order to facilitate the understanding of the above-mentioned equation (8).

The clock shift calculator 15a provides the calculated clk_diff(j) to the clock shift buffer adjustment value setter 15b. It is to be noted that while a calculation interval t2 of the clock shift buffer adjustment value is arbitrary, it is set so that a plurality of pieces of receiving packet state information may be included in the time t2, as shown in FIG. 8. In this embodiment (1), t2=t (see FIG. 4) for simplifying the description.

The clock shift buffer adjustment value setter 15b determines, according to the clk_diff(j), a clock shift buffer adjustment value per packet (=2nd buffer adjustment value (see FIG. 1), hereinafter, occasionally abbreviated as ajbuf_clk(j)) for compensating the steady clock shift. In this embodiment (1), the ajbuf_clk(j) is determined by the following equation (9) so as to cancel the variation of the average buffering amount per unit time by the clk_diff(j) (see FIG. 8):

$$ajbuf\_clk(j)=-clk\_diff(j) \quad \text{Eq. (9)}$$

This ajbuf_clk(j) is provided to the buffer adjustment value determiner 17w.

Buffer Adjustment Value Determiner 17w

The buffer adjustment value determiner 17w determines a final receiving buffer adjustment value (hereinafter, occasionally abbreviated as ajbuf_pk(j)) 64w based on the buffer adjustment value provided by the monitors 14w and 15w, i.e. based on an ajbuf_jit(j) 61w and an ajbuf_clk(j) 62w. In this embodiment (1), the ajbuf_pk(j) 64w is determined by the following equation (10):

$$ajbuf\_pk(j)=ajbuf\_jit(j)+ajbuf\_clk(j) \quad \text{Eq. (10)}$$

Namely, the ajbuf_pk(j) 64w is assumed to be an added value of the ajbuf_jit(j) 61w and the ajbuf_clk(j) 62w. The buffer adjustment value determiner 17w provides the calculated ajbuf_pk(j) 64w to the buffer controller 11w.

Buffer Controller 11w

The buffer controller 11w performs the reproducing process at regular intervals (hereinafter, occasionally abbreviated as t_play) synchronized with the clock of the voice producer 12. However, the producing process depends on the value of the provided ajbuf_pk(j).

Firstly, in case of ajbuf_pk(j)=0, the initial value (reference value) of the receiving packet buffer 10 is not required to be adjusted. Therefore, the voice packet (hereinafter, occasionally abbreviated as pk(m)) is extracted from the receiving packet buffer 10, and is reproduced as the voice data (hereinafter, occasionally abbreviated as sp(m)) to be provided to the voice reproducer 12.

Secondly, in case of ajbuf_pk(j)>0, the initial value (reference value) of the receiving packet buffer 10 is required to be increased. Therefore, by repeatedly using the voice packet pk(m) extracted from the receiving packet buffer 10, the sp(m) sp(m+1), . . . , sp(m+ajbuf_pk(j)−1) are provided to the voice reproducer 12 per t_play. The number of repetition is ajbuf_pk(j). Thus, the consumption of the receiving packet buffer 10 by reproducing the buffering amount is temporarily stopped, so that the number of accumulated packets of the receiving packet buffer 10 can be relatively increased by ajbuf_pk(j) units.

Furthermore, in case of ajbuf_pk(j)<0, the initial value (reference value) is required to be decreased. Therefore, ajbuf_pk(j) units of voice packets are extracted from the receiving buffer to be discarded, and the voice packets immediately following this discard are decoded into the voice data sp(m) to be outputted to the voice reproducer 12. Thus, the buffering amount of the receiving packet buffer 10 can be decreased by ajbuf_pk(j) units.

FIGS. 9A and 9B show examples of the number of accumulated packets (buffering amount) variation in the receiving packet buffer 10. These variation examples show a case where the variation of the jitter is equal to or less than a fixed value, and the clock shift occurs. FIG. 9A shows the variation example of the number of accumulated packets of the receiving packet buffer 10 in the prior art (1) accommodating to the clock shift, wherein controls accommodating to the jitter are performed upon occurrence of buffer underflows c1-c3, and the number of accumulated buffers is returned to a value accommodating to the jitter. FIG. 9B shows the variation example of the number of accumulated packets of the receiving packet buffer 10 in the embodiment (1). In this embodiment (1), the clock shift is regularly monitored, and the buffer control is performed based on the monitoring result. Therefore, the number of accumulated packets is adjusted to a value accommodating to the jitter before the buffer underflow occurs.

FIG. 10 shows a case where the jitter varies beyond the fixed value shown in FIGS. 9A and 9B. In this case, the reference value and the buffering size (the number of packets which can be accumulated in the receiving packet buffer 10) in the packet receiving device 100w of this embodiment (1) are adjusted in accordance with the jitter. Therefore, no underflow or overflow of the voice packet (buffering amount) occurs. This is because the variation of the buffering amount resulting from the jitter and the clock shift is independently monitored in the embodiment (1), the optimum buffer adjustment values 61w and 62w (see FIG. 2) are obtained for the jitter and the clock shift respectively, and the buffering amount is controlled by the receiving buffer adjustment value 64w based on the buffer adjustment amounts 61w and 62w. Thus, under the condition that the clock shift and the jitter occur at the same time, stable sound quality can be secured.

Voice Reproducer 12

The sp(m) received from the buffer controller 11w is outputted as the reproduced voice 54 in accordance with the reproduced clock.

Embodiment (2)

Adjustment by Reproduced Clock Information

Figure 11:
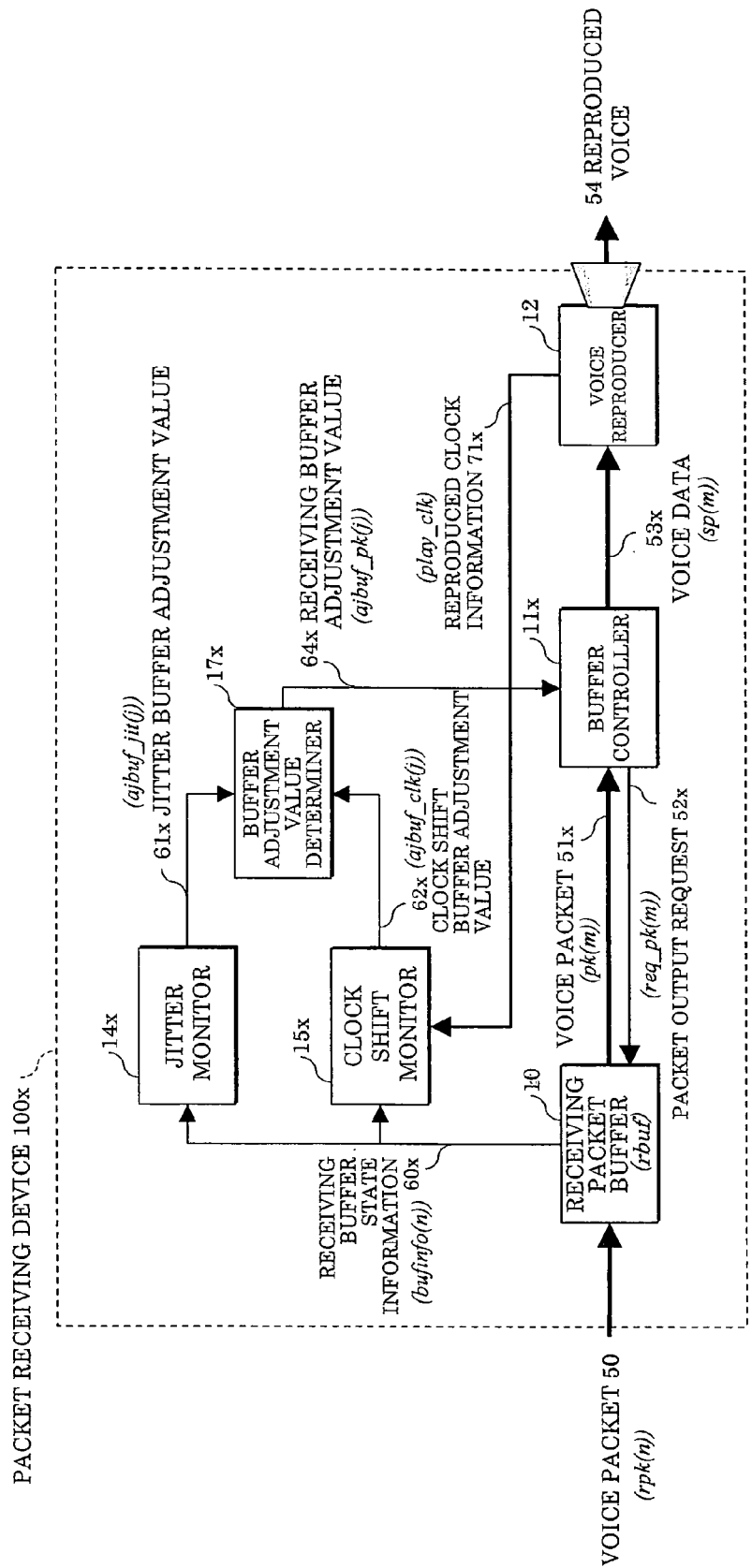
FIG. 11 is a block diagram showing an embodiment (2) of a packet receiving device according to the present invention.

FIG. 11 shows a packet receiving device 100x of the embodiment (2) according to the present invention. The arrangement of the packet receiving device 100x is basically the same as that of the packet receiving device 100w shown in the embodiment (1). However, a clock shift monitor 15x uses reproduced clock information 71x of the voice reproducer 12 as the parameter information together with receiving buffer state information 60x, which is different from the clock shift monitor 15w of the embodiment (1).

Figure 12:
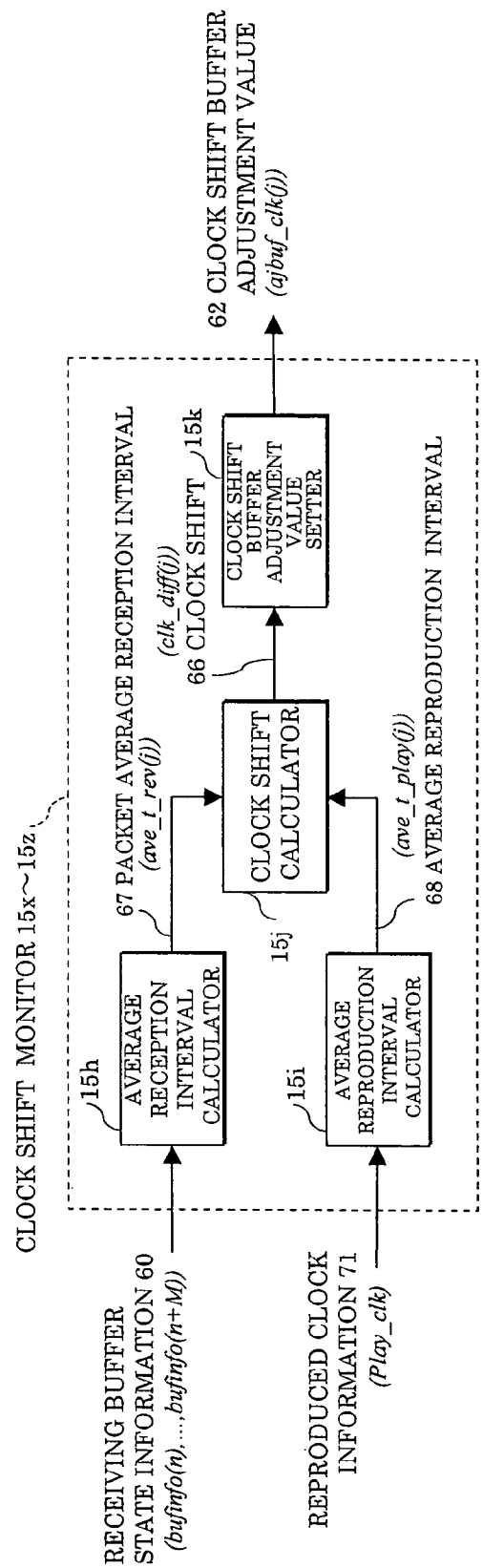
FIG. 12 is a block diagram showing an embodiment of an arrangement of a clock shift monitor in embodiments (2)-(4) of a packet receiving device according to the present invention.

FIG. 12 shows an embodiment of an arrangement of the clock shift monitor 15x used in the embodiment (2). It is to be noted that the monitor 15X is the same as clock shift monitors 15y and 15z described later. This clock shift monitor 15x is composed of an average reception interval calculator 15h, an average reproduction interval calculator 15i, a clock shift calculator 15j, and a clock shift buffer adjustment value setter 15k.

The average reception interval calculator 15h receives a plurality of pieces of receiving buffer state information (e.g. bufinfo(n)-bufinfo(n+M)) at regular intervals t2, and calculates, by using the bufinfo(n)-bufinfo(n+M), the average reception interval (hereinafter, abbreviated as ave_t_rev(j); j is the number of monitoring sections) to be provided to the clock shift calculator 15j. The ave_t_rev(j) can be obtained as an average of e.g. a packet reception time (hereinafter, occasionally abbreviated as rtime(n); n=1, 2, . . . ) rtime(n).

The average reproduction interval calculator 15i receives the reproducing clock information (hereinafter, occasionally abbreviated as play_clk) from the voice reproducer 12, and calculates, based on the play_clk, the average reproduction interval (hereinafter, occasionally abbreviated as ave_t_play (j); j=the number of monitoring sections) of the voice reproducer 12 to be provided to the clock shift calculator 15j.

The clock shift calculator 15j calculates the clock shift (hereinafter, occasionally abbreviated as clk_diff(j)) between the transmission and reception by using the average reception interval (=transmission interval on the transmission side) and the ave_t_play(j) (=reproduction interval on the reception side). In the embodiment (2), a clk_diff(j) 66 per unit time can be obtained by using a ratio between the average reception interval and the average reproduction interval with the following equation (11):

$$clk\_diff(j)=t2/t\_play(1-ave\_t\_rev/ave\_t\_play) \quad \text{Eq. (11)}$$

The clock shift calculator 15j provides the calculated clk_diff(j) to the clock shift buffer adjustment value setter 15k. It is to be noted that while the calculation interval t2 of the clock shift is arbitrary, it is set so that a plurality of pieces of reception packet state information may be included in the interval at the time t2 as shown in FIG. 7. In the embodiment (2), t2=t (see FIG. 4) in order to simplify the description.

The clock shift buffer adjustment value setter 15k determines a buffer adjustment value (hereinafter, occasionally abbreviated as ajbuf_clk(j)) 62x per packet for compensating the buffer variation due to the steady shift as the second buffer adjustment value based on the clk_diff(j). In this embodiment (2), the ajbuf_clk(j) 62x is calculated by the following equation (12) so as to cancel the variation of the average buffering amount per unit time by the clock shift:

$$ajbuf\_clk(j)=-clk\_diff(j) \quad \text{Eq. (12)}$$

The clock shift buffer adjustment value setter 15k provides the ajbuf_clk(j) to the buffer adjustment value determiner 17x. The operation of the packet receiving device 100x hereafter is the same as that of the packet receiving device 100w in the embodiment (1).

Embodiment (3)

Adjustment by Voiced/Voiceless Packet

Figure 13:
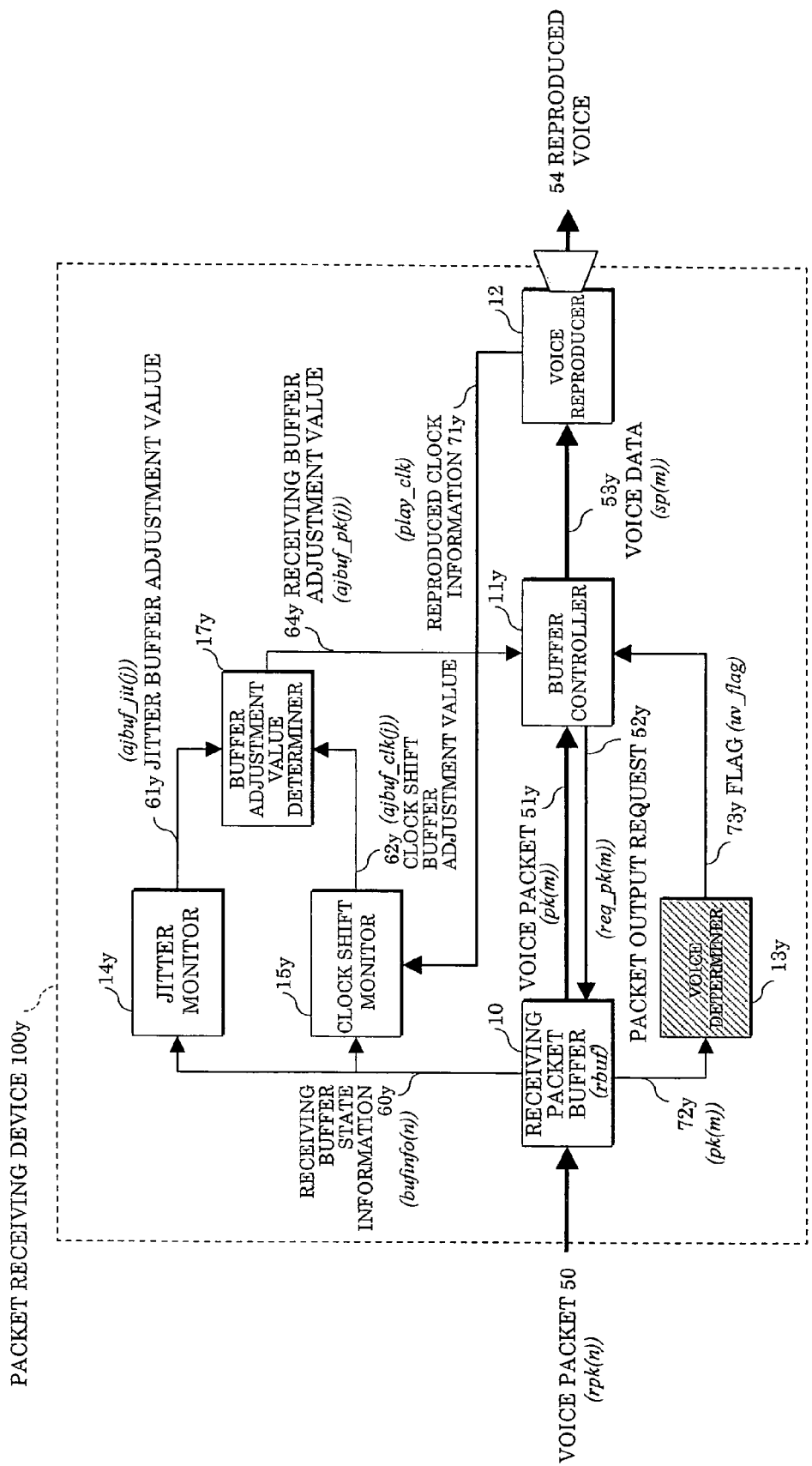
FIG. 13 is a block diagram showing an embodiment (3) of a packet receiving device according to the present invention.

FIG. 13 shows a packet receiving device 100y in an embodiment (3) according to the present invention. The arrangement of the packet receiving device 100y is the same as that of the packet receiving device 100x shown in the embodiment (2). However, it is different from the embodiment (2) in that a voice determiner 13y is added. Furthermore, it is different from the packet receiving device 100x that a buffer controller 11y controls the buffer 10 based on a flag (hereinafter, occasionally abbreviated as uv_flag) 73y received from the voice determiner 13y and the receiving buffer adjustment value 64y.

The voice determiner 13y receives a voice packet (hereinafter, occasionally abbreviated as pk(m); m=the number of reproduced frames) 72y from the receiving packet buffer 10. The voice determiner 13y determines whether pk(m)72y is voiced or voiceless (interval between utterances) based on encoded information of the pk(m) 72y and the pk(m) 72y temporarily decoded. When the voice packet is in a non-voice section, uv_flag="1" is provided to the buffer controller 11y. When the voice packet is voiced, the uv_flag 73y indicating uv_flag="0" is provided to the buffer controller 11y. In the embodiment (3), the voice determination can be performed by using the power variation characteristic of the voice data. When the discarding process of the voice packet or repeated reproduction process is performed, the buffer controller 11y performs the processes to the voice packet of the uv_flag=1. Thus, the deterioration of the reproduction sound quality can be reduced.

Embodiment (4)

Feedback of Actual Value

FIG. 14 shows a packet receiving device 100z in an embodiment (4) according to the present invention. The arrangement of the packet receiving device 100z is basically the same as that of the packet receiving device 100y shown in the embodiment (3). However, it is different from the embodiment (3) in that a buffer controller 11z provides an actual value (hereinafter, occasionally abbreviated as r_ajbuf(j)) 74 to a buffer adjustment value determiner 17z. The operations of the buffer controller 11z and the buffer adjustment value determiner 17z will now be described.

The buffer controller 11z responds the number of packets in which an adjustment to an ajbuf_pk(j) 64z inputted in the monitoring section "j" has actually completed as the actual value (hereinafter, occasionally abbreviated as r_ajbuf(j)) 74 to the buffer adjustment value determiner 17z. The buffer adjustment value determiner 17z having received the r_ajbuf (j) 74 determines the buffer adjustment value (hereinafter, abbreviated as ajbuf_pk(j+1)) 64z of the subsequent section "j+1" including the number of packets to which the adjustment has not been completed in section "j" by using the following equation (13):

$$ajbuf\_pk(j+1)=ajbuf\_jit(j+1)+ajbuf\_clk(j+1)+ \\ (ajbuf\_pk(j)-r\_ajbuf(j))) \quad \text{Eq. (13)}$$

Thus, more detailed buffering amount adjustment is made possible.

What we claimed is:

1. A packet receiving method comprising:
a first step of temporarily storing a voice packet received in a receiving packet buffer;
a plurality of second steps of determining a jitter buffer adjustment value for a jitter of the voice packet indicating a variation of a buffering amount of the receiving packet buffer arising from a network state, and determining a clock shift buffer adjustment value for a variation of a steady buffering amount of the receiving packet buffer arising from a clock shift occurring concurrently with the jitter between a transmitting terminal and a receiving terminal;
a third step of determining a receiving buffer adjustment value for the receiving packet buffer by adding both of the buffer adjustment values; and
a fourth step of controlling the buffering amount of the receiving packet buffer based on the receiving buffer adjustment value.

2. The packet receiving method as claimed in claim 1 wherein the parameter information further includes one or more pieces of parameter information which can be obtained from a packet receiving device itself.

3. The packet receiving method as claimed in claim 1, further comprising a fifth step, between the third step and the fourth step, of determining whether or not a voice is included in the voice packet temporarily stored,
the fourth step comprising controlling the buffering amount based on a determination result of the fifth step in addition to the receiving buffer adjustment value.

4. The packet receiving method as claimed in claim 1 wherein the fourth step comprises monitoring an actual value of the receiving buffer adjustment value, and the third step comprises determining the receiving buffer adjustment value by adding the actual value to the buffer adjustment values.

5. The packet receiving method as claimed in claim 1 wherein the parameter information comprises an arrival time of the voice packet, a number of voice packets stored in the receiving packet buffer, and a sequence number indicating a transmission order of the voice packets.

6. A packet receiving device comprising:
a receiving packet buffer which temporarily stores a voice packet received;
a plurality of parameter information monitors which determines a jitter buffer adjustment value for a jitter of the voice packet indicating a variation of a buffering amount of the receiving packet buffer arising from a network state, and determines a clock shift buffer adjustment value for a variation of a steady buffering amount of the receiving packet buffer arising from a clock shift occurring concurrently with the jitter between a transmitting terminal and a receiving terminal;
a buffer adjustment value determiner which determines a receiving buffer adjustment value for the receiving packet buffer by adding both of the buffer adjustment values; and
a buffer controller which controls the buffering amount of the receiving packet buffer based on the receiving buffer adjustment value.

7. The packet receiving device as claimed in claim 6 wherein the parameter information further includes one or more pieces of parameter information which can be obtained from the packet receiving device itself.

8. The packet receiving device as claimed in claim 7 wherein the parameter information obtained from the packet receiving device itself comprises reproducing clock information.

9. The packet receiving device as claimed in claim 6, further comprising a voice determiner which determines whether or not a voice is included in the voice packet temporarily stored in the receiving packet buffer,
the buffer controller controlling the buffering amount based on a determination result of the voice determiner in addition to the receiving buffer adjustment value.

10. The packet receiving device as claimed in claim 9 wherein the buffer controller discards the voice packet or repeatedly performs output processing only to the voice packet in a non-voice section determined by the voice determiner based on the receiving buffer adjustment value, and increases or decreases the buffering amount.

11. The packet receiving device as claimed in claim 6 wherein the buffer controller monitors an actual value of the receiving buffer adjustment value, and the buffer adjustment value determiner determines the receiving buffer adjustment value by adding the actual value to the buffer adjustment values.

12. The packet receiving device as claimed in claim 6 wherein the parameter information comprises an arrival time of the voice packet, a number of voice packets stored in the receiving packet buffer, and a sequence number indicating a transmission order of the voice packets.

13. The packet receiving device as claimed in claim 6 wherein the jitter calculator obtains the jitter value by using a sequence number of the voice packet received, a reception time, a number of accumulated packets upon reception.

14. The packet receiving device as claimed in claim 6 wherein the clock shift calculator obtains the clock shift by using an average of a number of accumulated packets upon reception of the voice packet.

15. The packet receiving device as claimed in claim 6 wherein the buffer controller discards the voice packet or repeatedly performs output processing based on the receiving buffer adjustment value, and increases or decreases the buffering amount.

16. The packet receiving device as claimed in claim 6 wherein when the buffering amount is increased based on the receiving buffer adjustment value, the buffer controller uses an interpolation packet generated from the preceding and subsequent voice packets by interpolating.

17. The packet receiving device as claimed in claim 6 wherein the parameter information monitors change a monitor time interval of each parameter information according to a transmission line state.

* * * * *